United States Patent
Ito et al.

(10) Patent No.: US 6,823,252 B2
(45) Date of Patent: Nov. 23, 2004

(54) DRIVE POWER DISTRIBUTION CONTROL METHOD AND DEVICE FOR FOUR-WHEEL DRIVE VEHICLE

(75) Inventors: Isao Ito, Iwakura (JP); Tsuyoshi Murakami, Handa (JP); Ryouhei Shigeta, Hiroshima (JP); Hisaaki Wakao, Kariya (JP); Yasushi Yamada, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/464,656

(22) Filed: Jun. 19, 2003

(65) Prior Publication Data

US 2004/0035622 A1 Feb. 26, 2004

(30) Foreign Application Priority Data

Jun. 19, 2002 (JP) ..................... 2002-178621
Aug. 29, 2002 (JP) ..................... 2002-251656
Sep. 25, 2002 (JP) ..................... 2002-278999

(51) Int. Cl.$^7$ .............................................. B60K 17/34
(52) U.S. Cl. .................... 701/82; 180/197; 180/244
(58) Field of Search ............................... 701/82, 87, 89, 701/90; 180/197, 244, 248, 249

(56) References Cited

U.S. PATENT DOCUMENTS

| 4,762,213 A | * | 8/1988 | Watanabe ................. 192/82 T |
| 5,941,613 A | * | 8/1999 | Tagawa ..................... 303/190 |
| 5,947,224 A | | 9/1999 | Kouno |
| 6,606,549 B1 | | 8/2003 | Murakami et al. |

FOREIGN PATENT DOCUMENTS

| EP | 1 104 715 | 6/2001 |
| JP | 11-208303 | 8/1999 |
| JP | 2002-206566 | 7/2002 |

* cited by examiner

Primary Examiner—Marthe Y. Marc-Coleman
(74) Attorney, Agent, or Firm—Oblon, Spivak, McClelland, Maier & Neustadt, P.C.

(57) ABSTRACT

A four-wheel drive vehicle is provided with a drive power transmission device for controlling the connection degree of a front wheel axle driven by an engine with a rear wheel axle. A drive power distribution control device is responsive to a vehicle speed, a rotational difference between front wheels driven by the front wheel axle and rear wheels driven by the rear wheel axle, a throttle opening degree signal and the like and controls the drive power transmission device. The drive power distribution control device judges whether the vehicle is beginning to start or not and at the starting of the vehicle, controls the transmission rate of the drive power transmission device in dependence on the state or manner in which the vehicle is beginning to start.

15 Claims, 17 Drawing Sheets

DRIVE POWER DISTRIBUTION CONTROL METHOD AND DEVICE FOR FOUR-WHEEL DRIVE VEHICLE

INCORPORATION BY REFERENCE

This application is based on and claims priority under 35 U.S.C. 119 with respect to Japanese Applications No. 2002-178621, No. 2002-251656 and No. 2002-278999 filed on Jun. 19, 2002, Aug. 29, 2002 and Sep. 25, 2002 respectively, the entire contents of which are incorporated herein by reference.

BACKGROUND OF THE INVENTION

1. Field of the Invention

The present invention relates to a drive power distribution control method and device for a four-wheel drive vehicle. It also relates to a four-wheel drive vehicle having the drive power distribution control device.

2. Discussion of the Related Art

Heretofore, there has been known a drive power distribution control device for a four-wheel vehicle, wherein the drive power transmission rate of a drive power transmission device is variably controlled in dependence upon a vehicle speed and an acceleration manipulation amount (e.g., a throttle opening degree in the case of a gasoline engine car) so as to variably control the drive power distribution rate between front and rear wheels. More specifically, a drive power (transmission torque) depending on the vehicle speed and the acceleration manipulation amount is obtained by reference to a predetermined torque characteristic map, and the friction engagement force of an electromagnetic clutch constituting the drive power transmission device for the four-wheel drive vehicle is controlled so that the torque so obtained can be transmitted to the front wheels or the rear wheels. The torque characteristic map is a table map of the type that a transmission torque can be extracted by designating the vehicle speed and the acceleration manipulation amount as parameters and is prepared in advance by experiments using a vehicle model or by a well-know theoretical calculation processing.

However, the foregoing known drive power distribution control device for the four-wheel drive vehicle involves the following problems. For example, in a vehicle with an automatic transmission (hereafter referred to as "AT vehicle"), the vehicle in an idling state with the transmission being selected to D-range is advanced due to a so-called creep phenomenon even when the driver does not make the acceleration manipulation (i.e., stepping-on manipulation of an accel pedal). This is because the drive power of an engine being in the idling state is transmitted to the drive wheels through a torque converter of the AT (automatic transmission).

For the reason mentioned above, even during the creep motion or a low speed traveling, the drive wheels (i.e., the front wheels in a vehicle of the front-drive basis) tend to slip on an excessively small "$\mu$" road (i.e., a slippery road such as an "eisbahn" or the like). For example, where the vehicle stands stopped on an ascending road with the "eisbahn", the front wheels happen to slip at the moment that the driver shifts to the D-range. In this case, the problem can be solved by increasing the drive power distributed to the driven wheels (e.g., rear wheels) in dependence on the rotational speed difference between the front and rear wheels.

However, it is often the case that the drive power distributed to the driven wheels is to be restrained in order to avoid a tight-corner braking phenomenon which occurs at the time of, for instance, garaging or the like (namely, the phenomenon in which a braking torque is generated against the front wheels due to the difference in the average turning radius between the front and rear wheels in the case for example that much more drive power is distributed to the rear wheels during a turning motion). This does not allow to unconditionally increase the drive power to be distributed to the rear wheels (driven wheels) in dependence on the rotational speed difference between the front and rear wheels. Accordingly, it has been difficult to restrain the front wheels (drive wheels) from slipping at the time of starting on the excessively small "$\mu$" road.

Further, the known four-wheel drive vehicle involves another problem concerning a quick starting which can be done with the engine being kept rotated at a high speed. If the front wheels are brought into connection with the rear wheels at such a quick starting, it often occurs that the passengers suffer a shock (torque shock). Such a torque shock has been verified to be large when the vehicle is started quickly with the drive power output from the engine being maintained at a high power.

In addition, another drive power distribution control device for a four-wheel vehicle of a similar type has also been known as described in Japanese unexamined, published patent application No. 2002-206566. In this known drive power distribution control device, when the drive mode is set in AUTO mode, the opening degree of a throttle valve, a vehicle speed and a rotational difference between the rotational speeds of front and rear wheels are extracted from two torque maps based on signals from sensors and are made reference thereto to extract a first transmission torque depending on the throttle opening degree, a second transmission torque depending on the front-rear rotational difference and first and second gains depending on the vehicle speed. A command transmission torque to be distributed to the rear wheels is calculated by summing up the product of the first transmission torque and the first gain and the product of the second transmission torque and the second gain. And, in the know device, the torque maps are designed so that first and second transmission torques are increased with the respective increases in the throttle opening degree and the front-rear rotational difference, while the first and second gains are decreased with increase in the vehicle speed; i.e., the first and second gains are set larger when the vehicle speed is low.

However, the prior art of the Japanese patent application does not describe how to control the command transmission torque to be distributed to the rear wheels at the starting of the vehicle in connection with the state or manner in which the vehicle is beginning to start, such as for example the state of a road surface on which the vehicle is beginning to start or the manner of beginning to start the vehicle.

SUMMARY OF THE INVENTION

Accordingly, it is a primary object of the present invention to provide an improved torque distribution control device for a four-wheel drive vehicle capable of restraining drive wheels from skidding or slipping at the starting of the vehicle.

Another object of the present invention is to provide a four-wheel drive vehicle having an improved torque distribution control device capable of preventing or restraining a torque shock from being generated even when the vehicle is brought into the four-wheel drive state with an engine being in the state of a high power output.

Still another object of the present invention is to provide an improved torque distribution control device for a four-wheel drive vehicle capable of controlling the drive torque to be transmitted to rear wheels so that the slips or skids of both front and rear wheels can be restrained to the least.

Briefly, according to a general inventive concept of the present invention, there is provided a drive power distribution control method and device for a four-wheel drive vehicle for variably controlling the amount of drive power distributed to a driven wheel axle by variably controlling the power transmission rate of a drive power transmission device based on signals from various sensing means including at least vehicle speed sensing means for detecting the vehicle speed. The drive power distribution control method and device comprises a traveling state judgment step and means for judging whether the vehicle is beginning to start or not and also judging the state or manner in which the vehicle is beginning to start. The drive power distribution control method and device further comprises a transmission torque control step and means operable when it is judged based on a vehicle speed signal that the vehicle is beginning to start, for controlling the drive torque transmitted to the driven wheels in dependence on the state or manner judged by the traveling state judgment step and means.

With this configuration, the starting of the vehicle is discriminated from an ordinary four-wheel drive traveling state, and when it is detected that the vehicle is beginning to start, the drive torque transmitted to the driven wheels is controlled in dependence on the state or manner in which the vehicle is beginning to start. For example, the vehicle may be beginning to start in a state such as a slippery road whose surface friction coefficient is excessively small, or in a manner such as a quick starting. Therefore, when the vehicle starts, a drive torque appropriate to the state or manner in which the vehicle is beginning to start is transmitted to the drive wheels, so that slips or skids of either of the front and rear wheels can be restrained to the least.

In one specific aspect of the present invention, there is provided a drive power distribution control method and device for a four-wheel drive vehicle for variably controlling the amount of a drive power distributed to a driven wheel axle by variably controlling the power transmission rate of a drive power transmission device based on a vehicle speed obtained from a vehicle speed sensing step and means and an acceleration manipulation amount obtained from an acceleration manipulation amount detection step and means. The control method and device comprises a traveling state judgment step and means for judging whether the vehicle is beginning to start or not, and a control step and means for controlling the power transmission rate of the drive power transmission device to make the amount of the drive power distributed to the driven wheel axle larger than an ordinary value for an ordinary four-wheel drive traveling when it is judged by the traveling state judgment step and means that the vehicle is beginning to start.

With this configuration, the drive power transmission rate of the drive power transmission device is variably controlled based on the vehicle speed obtained from the vehicle speed detection step and means and the acceleration manipulation amount obtained from the acceleration manipulation step and means and thus, the drive power to be distributed to the driven wheels is controlled variably. When the traveling state of the vehicle is at the starting, the transmission rate of the drive power transmission device is controlled in such a manner that much more drive power than an ordinary value is transmitted to the driven wheels. As a result, the drive wheels can be restrained from slipping at the time of starting.

In another specific aspect of the present invention, there is provided a four-wheel drive vehicle having a primary drive wheel axle connected to drive wheels; a secondary drive wheel axle connected to driven wheels; drive means for driving said primary drive wheel axle; and a drive power transmission device for transmitting a drive power from said drive means to said secondary drive wheel axle. There is further provided a control method for the four-wheel drive vehicle of the aforementioned construction. The control method and the four-wheel drive vehicle further comprise a detection step and means for detecting whether a quick starting has taken place or not of said vehicle, based on a predetermined high drive power output from the drive means; and a control step and means for reducing the drive power transmitted from the drive power transmission device to the secondary drive wheel axle when the quick stating has taken place, by a predetermined amount than that which the drive power transmission device transmits to said secondary drive wheel axle when the vehicle is in an ordinary four-wheel drive traveling.

With this configuration, when the quick stating has taken place with the drive means outputting the predetermined high drive power output, the drive power transmitted from the drive power transmission device to the secondary drive wheel axle is reduced by the predetermined amount than an ordinary drive power given to the secondary drive wheel axle in the ordinary four-wheel drive traveling. Thus, the toque shock which would otherwise occur when the quick starting of the vehicle is performed can be prevented from being generated or restrained to the least.

In a further specific aspect of the present invention, there is provided a control method and device for a drive power transmission device of a vehicle of the type wherein one drive axle and the other drive axle are connected by the drive power transmission device in dependence upon a wheel speed difference between drive wheels driven by the drive power of said one drive axle and driven wheels driven by the drive power of said other drive axle so as to transmit the drive power from said one drive axle to said other drive axle. The control method and device comprises a vehicle starting detection step and means for detecting whether the vehicle is beginning to start or not; a slip amount calculation step and means for calculating a slip amount based on the wheel speed difference between the drive wheels rotated by the drive power of said one drive axle and the driven wheels rotated by the drive power of said other drive axle; and a connection degree determination step and means responsive to the slip amount calculated by the slip amount calculation step and means for determining the connection degree by the drive power transmission device of said one drive axle with said other drive axle when it is detected that the vehicle is beginning to start.

With this configuration, when it is detected that the vehicle is beginning to start, a slip amount is detected from a wheel speed difference between the drive wheels rotated by one drive axle and the drive wheels rotated by the other drive axle, and the connection degree of the drive power transmission device of said one drive axle with said other drive axle is controlled in dependence on the detected slip amount. Thus, the slip of the vehicle can be restrained in adaptation for the state of a road surface on which the vehicle is beginning to start, so that the performance of the vehicle at the time of starting can be enhanced where the road is of a small "$\mu$" (friction coefficient) surface or bumpy. In addition, where the vehicle travels with little slip on a large "$\mu$" surface road, the torque distribution to the driven wheel can be made small, so that the fuel consumption performed can be improved.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 8A:
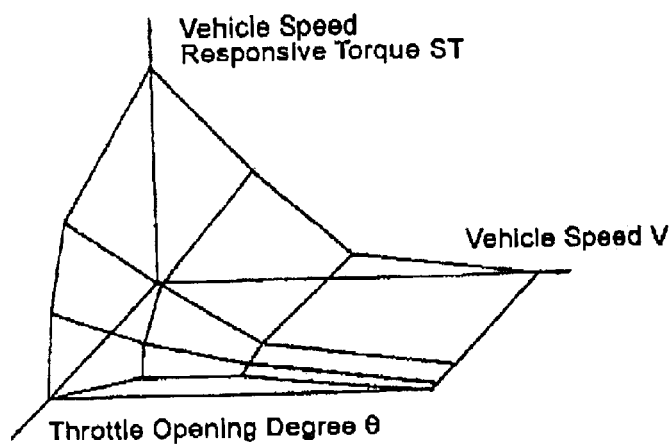
Figure 8B:
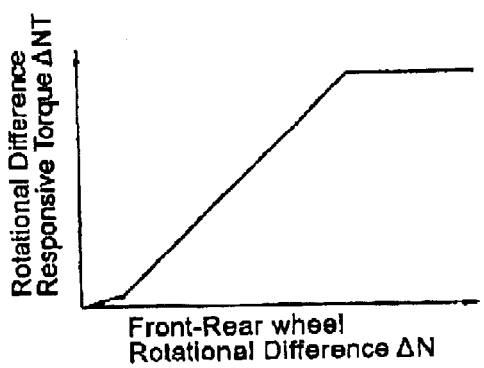
Figure 8C:
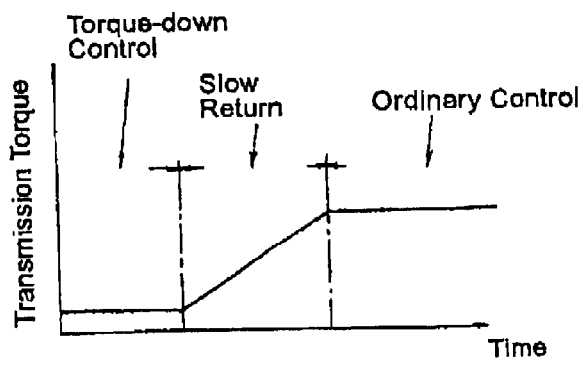
Figure 9:
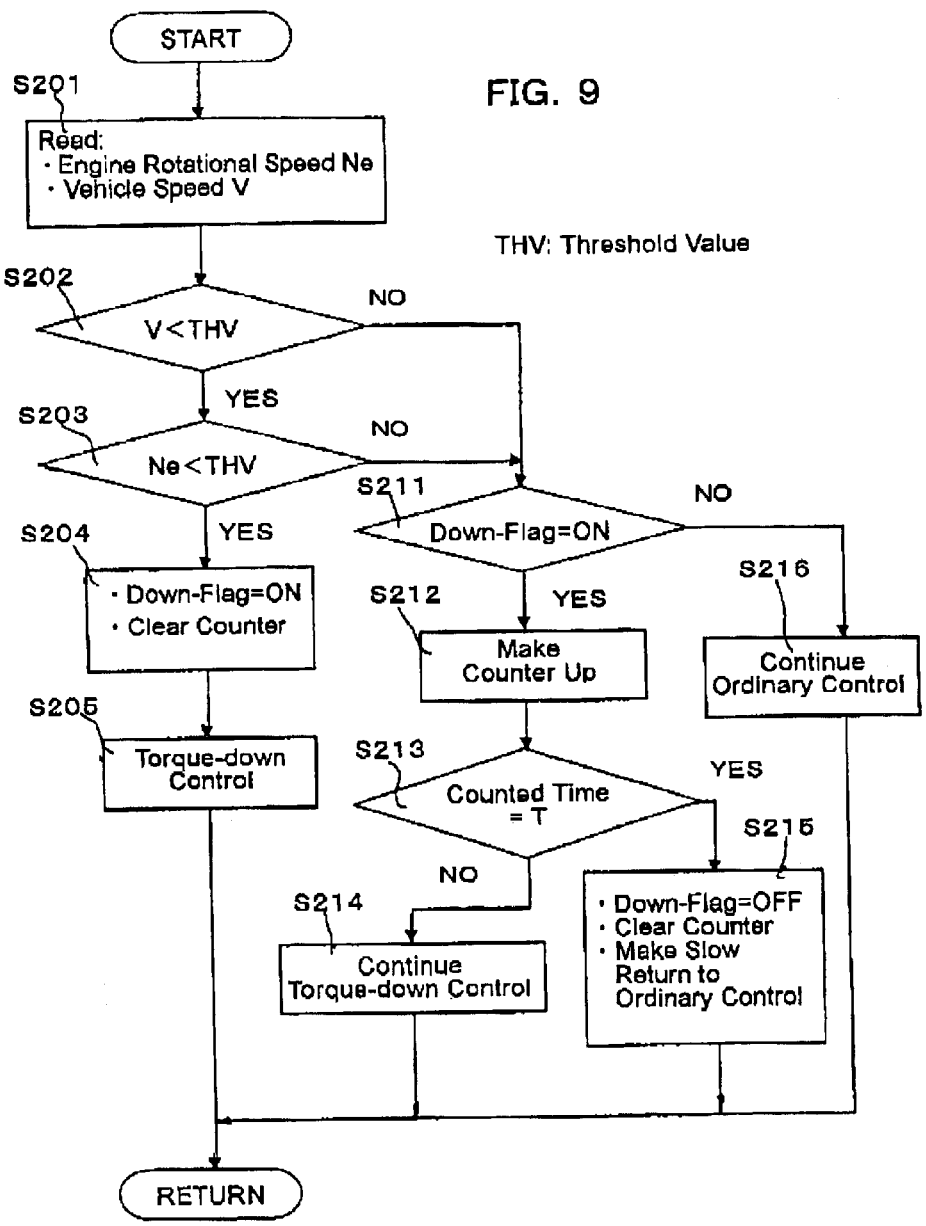
Figure 10:
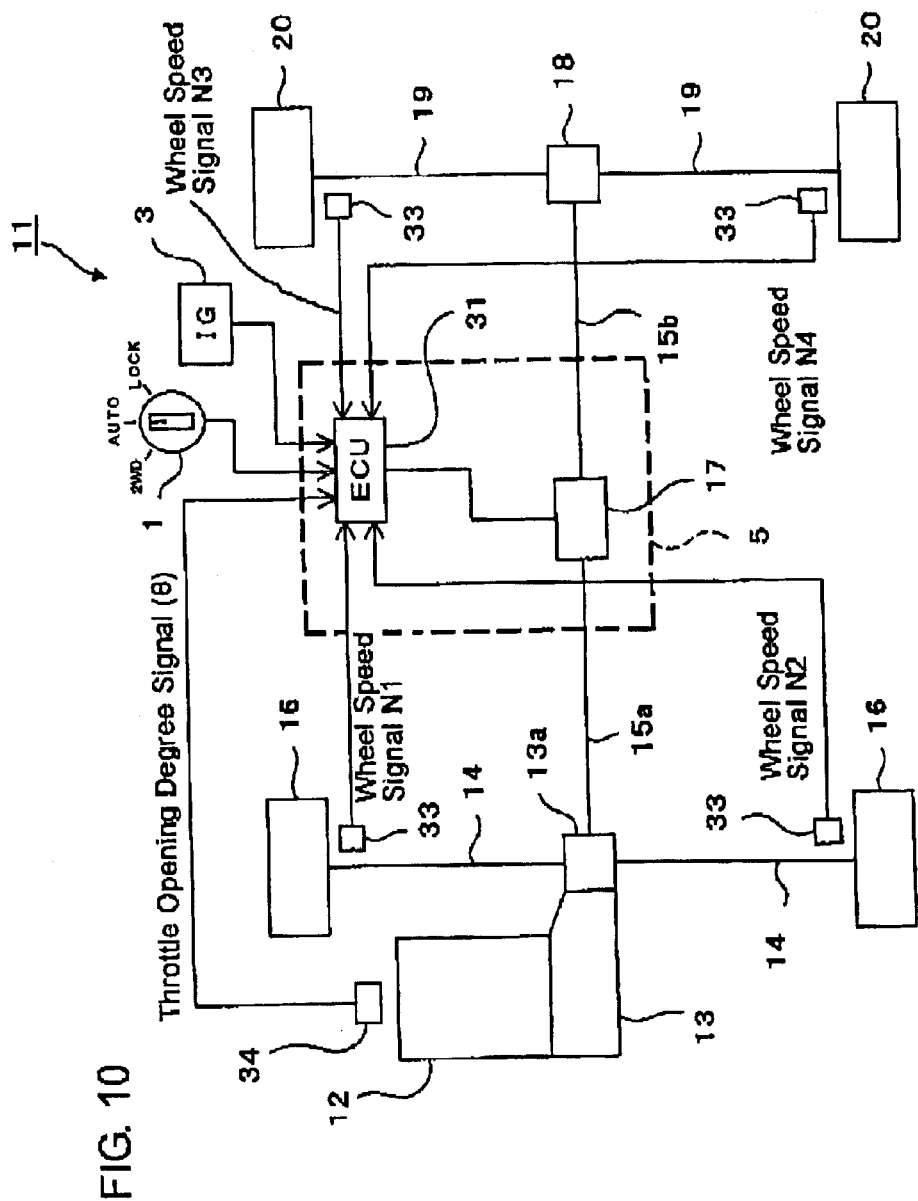
Figure 11:
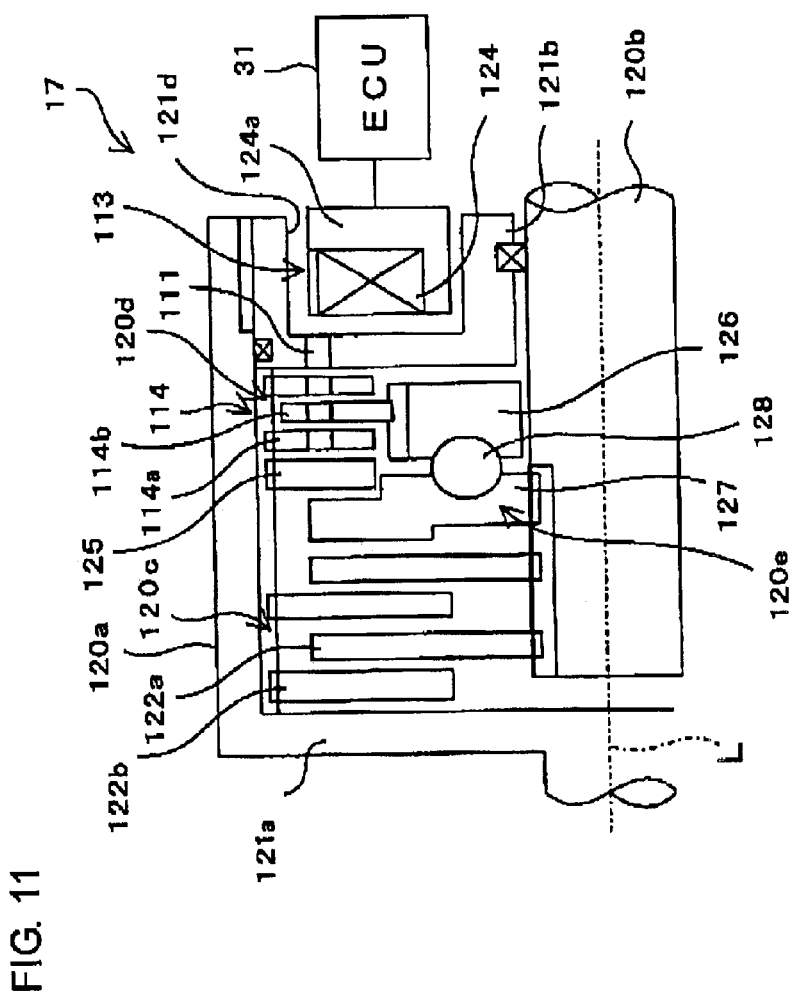
Figure 12:
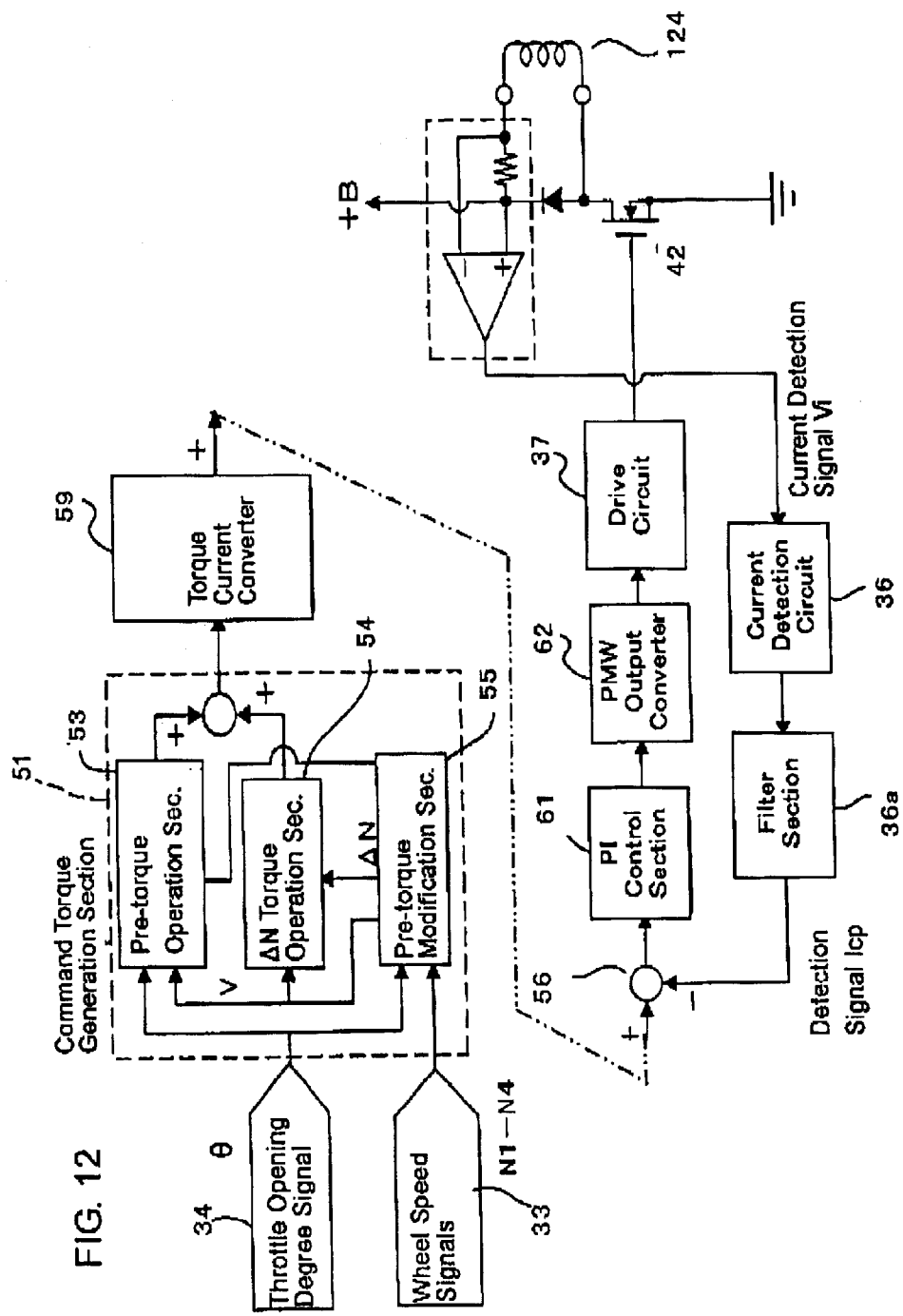
Figure 13:
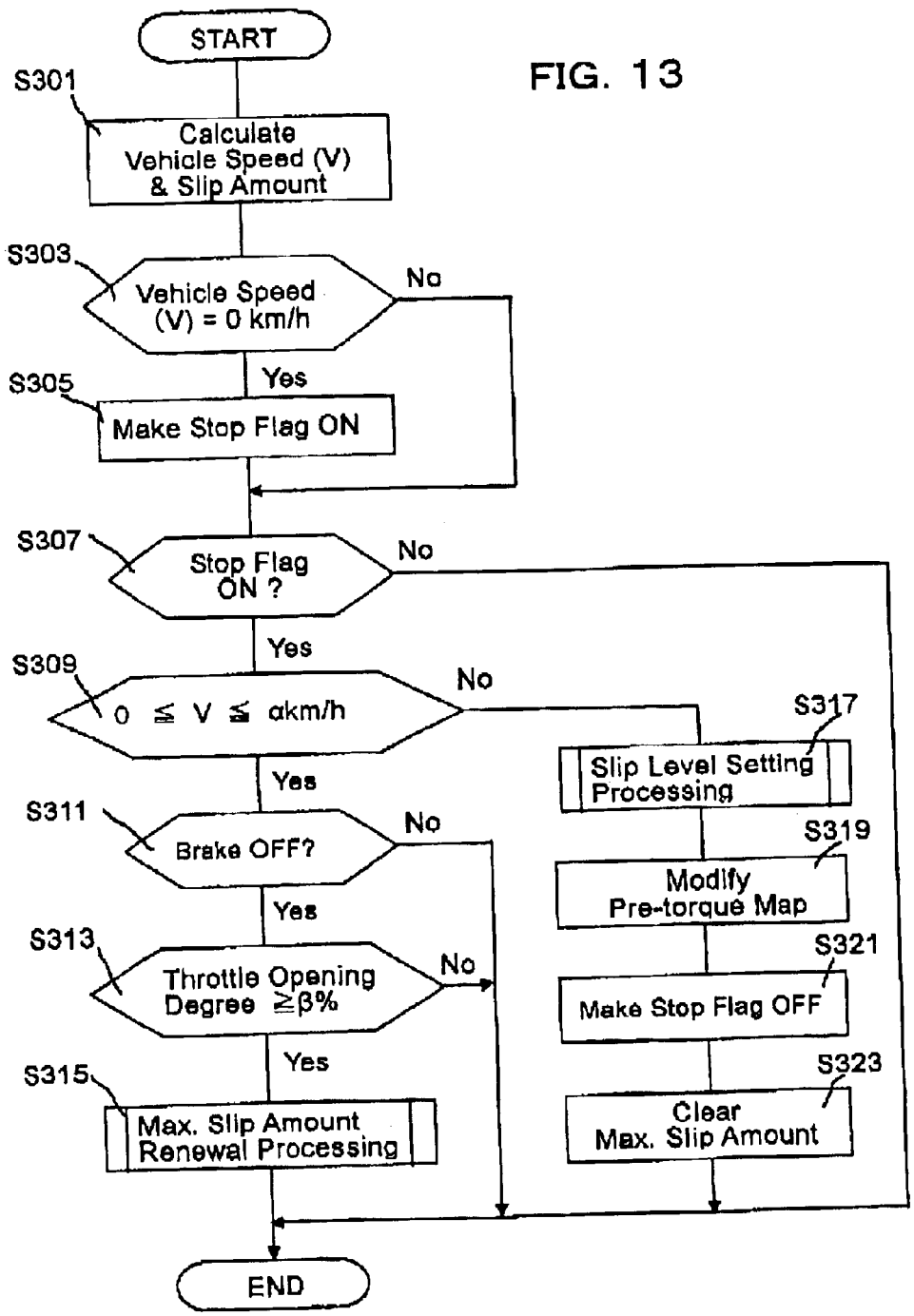
Figure 14:
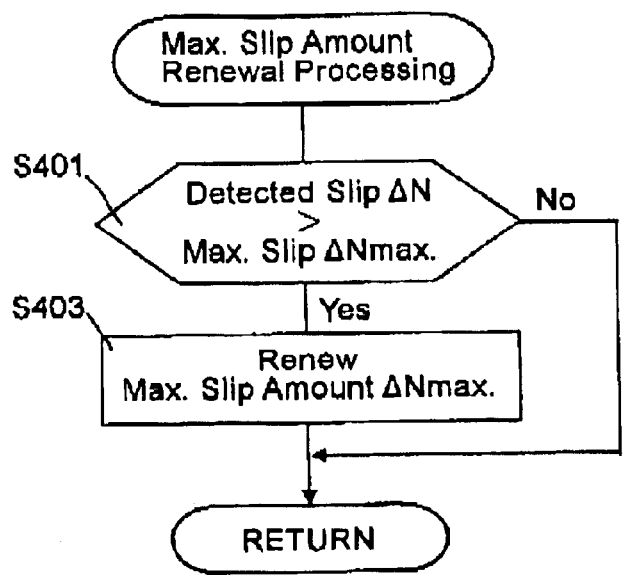
Figure 15:
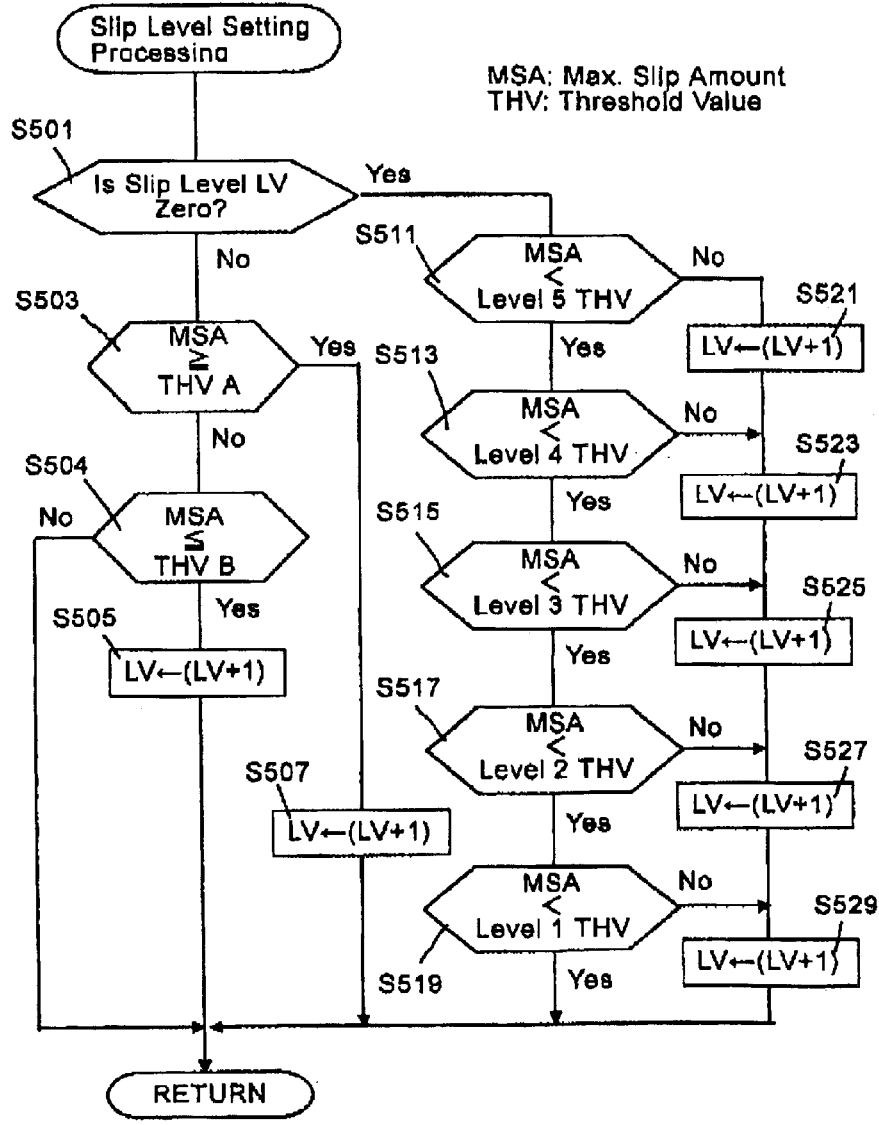
Figure 16:
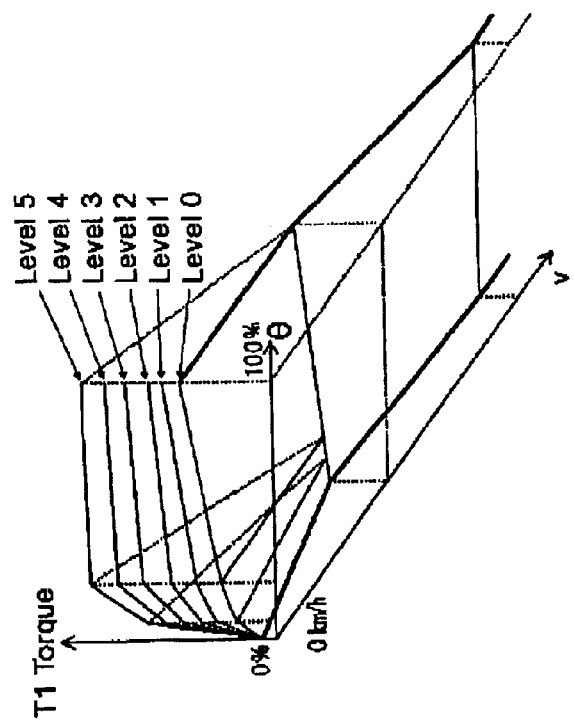
Figure 17:
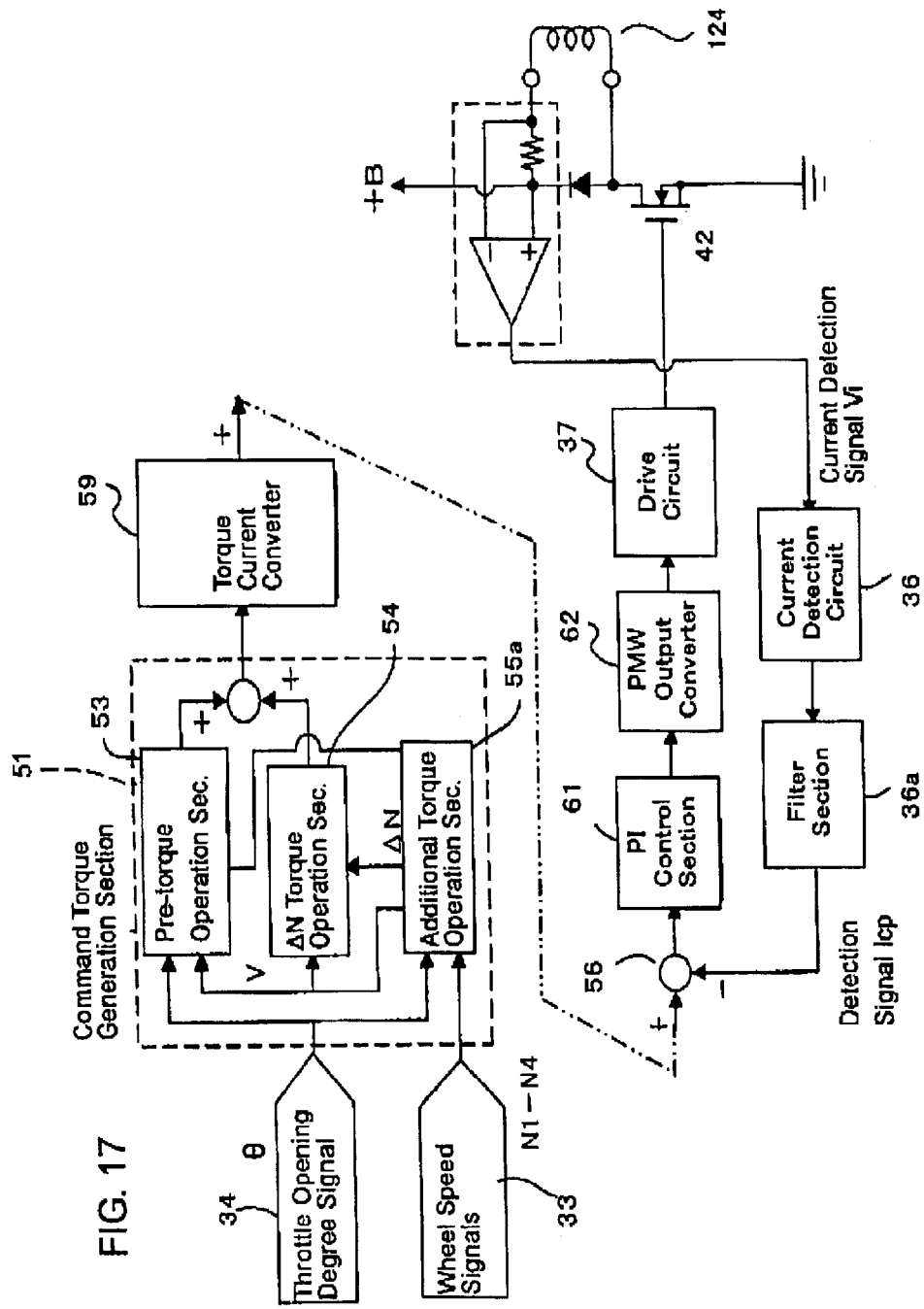

FIGS. 8(a), 8(b) and 8(c) are graphs showing base data used in determining the drive torque for a four-wheel drive vehicle;

FIG. 9 is a control program executed in determining the drive torque for the four-wheel drive vehicle;

FIG. 10 is a schematic diagram showing the general construction of a four-wheel drive vehicle according to the third embodiment of the present invention;

FIG. 11 is a fragmentary sectional view of a drive power transmission device used in the third embodiment;

FIG. 12 is a function block diagram representing the functions performed by a microcomputer of a drive power transmission control device in the third embodiment;

FIG. 13 is a flow chart of a pre-torque setting processing executed by the microcomputer of the drive power transmission control device in the third embodiment;

FIG. 14 is a flow chart of a maximum slip amount renewal processing executed by the microcomputer of the drive power transmission control device in the third embodiment;

FIG. 15 is a flow chart of a slip level setting processing executed by the microcomputer of the drive power transmission control device in the third embodiment;

FIG. 16 is an explanatory view representing one example of a pre-torque map which is modified at a pre-torque map modification step S319 shown in FIG. 13; and FIG. 17 is a function block diagram representing the functions performed by a microcomputer of a drive power transmission control device in a modified form of the third embodiment.

DETAILED DESCRIPTION OF THE PREFERRED EMBODIMENTS (First Embodiment)

Figure 1:
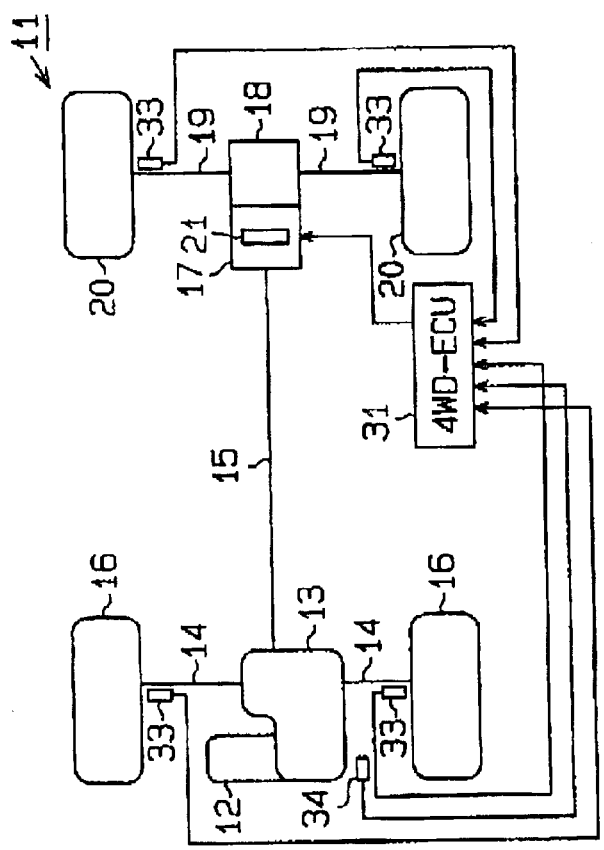
FIG. 1 is a schematic diagram showing the general construction of a four-wheel drive vehicle according to the first embodiment of the present invention.

In FIG. 1, a four-wheel drive vehicle 11 is provided with an internal combustion engine 12 and a transaxle 13. The transaxle 13 integrally incorporates a transmission, a transfer and so forth therein. The transaxle 13 has connected thereto a pair of front axles 14, 14 and a proper shaft 15. The front axles 14, 14 are connected respectively to front wheels 16, 16. The proper shaft 15 is connected to a drive power transmission/distribution device (torque coupling) 17, to which a rear differential 18 is connected through a drive pinion shaft (not shown). The rear differential 18 is connected to rear wheels 20, 20 through a pair of rear axles 19, 19.

The drive power of the engine 12 is transmitted to the front wheels 16, 16 through the transaxle 13 and the both of the front axles 14, 14. When the drive power transmission device 17 connects the proper shaft 15 with the drive pinion for torque transmission, the drive power of the engine 12 is transmitted to both of the rear wheels 20, 20 through the proper shaft 15, the drive pinion, the rear differential 18 and both of the rear axles 19, 19. In the exemplified embodiment, the front wheels 16 constitute primary or drive wheels, while the rear wheels 20 constitute secondary or driven wheels.

The drive power transmission device 17 incorporates an electromagnetic clutch mechanism 21 of a wet-type multiple disc type, which includes a plurality of clutch plates (not shown) which are brought into mutual friction engagement or mutually spaced relation. When a predetermined electric current is supplied to an electromagnetic coil 22 (see FIG. 2) incorporated into the electromagnetic clutch mechanism 21, the clutch plates are brought into friction engagement with one another, so that torque transmission is effected between the front wheels 16, 16 and the rear wheels 20, 20. Conversely, when the supply of the electric current to the electromagnetic clutch mechanism 21 is discontinued, the clutch plates are spaced apart from one another, so that the torque transmission is discontinued or reduced to the minimum between the front wheels 16, 16 and the rear wheels 20, 20.

Figure 6:
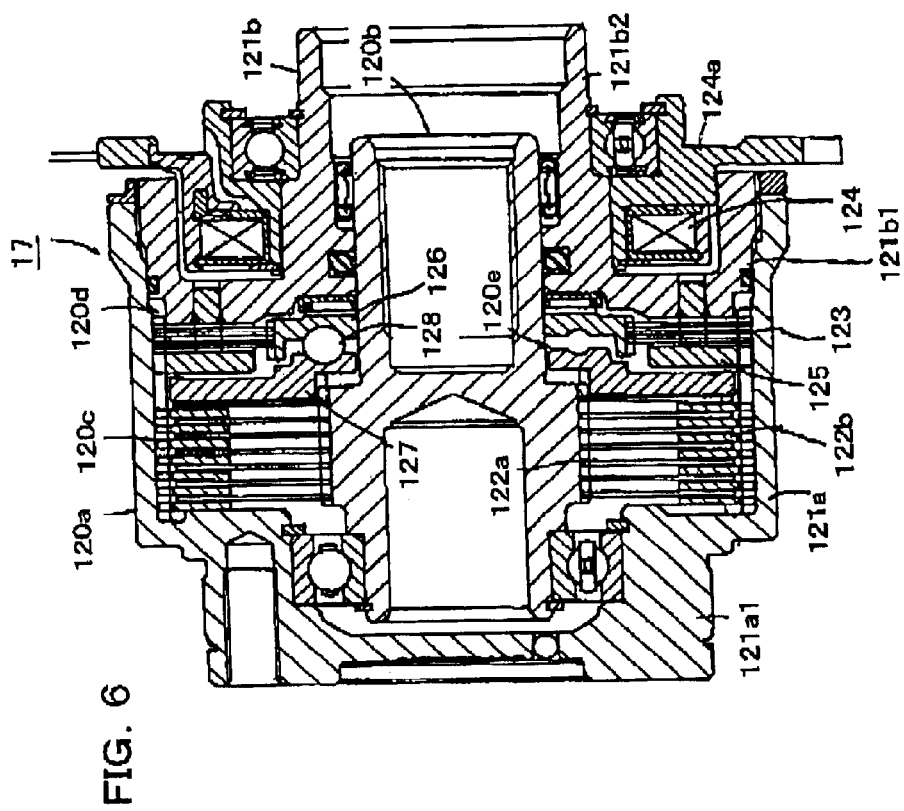
FIG. 6 is a sectional view of a drive power transmission device used in the second embodiment.

The friction engagement force of each clutch plate is increased or decreased in proportion to the amount of the current (the strength of the current) supplied to the electromagnetic coil 22. By controlling the current supply to the electromagnetic coil 22, the transmission torque between the front wheels 16, 16 and the rear wheels 20, 20, that is to say, the binding force between the front wheels 16,16 and the rear wheels 20, 20 is adjustable as required. When the friction engagement force of each clutch plate is augmented, the transmission torque between the front wheels 16, 16 and the rear wheels 20, 20 is augmented. Conversely, when the friction engagement force of each clutch plate is weakened, the transmission torque between the front wheels 16,16 and the rear wheels 20, 20 is decreased. Further detailed construction and function of the drive power transmission device 17 will be discussed with reference to FIG. 6 in connection with the second embodiment, and therefore, the description concerning FIG. 6 is incorporated into this first embodiment to constitute a par thereof.

The current supply to the electromagnetic coil 22, the discontinuation thereof and the adjustment of current supply thereto can be controlled by an electronic control unit (hereinafter referred to as a "drive power distribution control device 31 (4WD-ECU)") for drive power distribution. More specifically, the drive power distribution control device 31 selects either a four-wheel drive state or a two-wheel drive state by controlling the friction engagement force of each clutch plate and at the same time, controls the drive power distribution ratio or rate (i.e., drive power transmission rate or torque distribution rate) between the front wheels 16, 16 and the rear wheels 20, 20.

Figure 2:
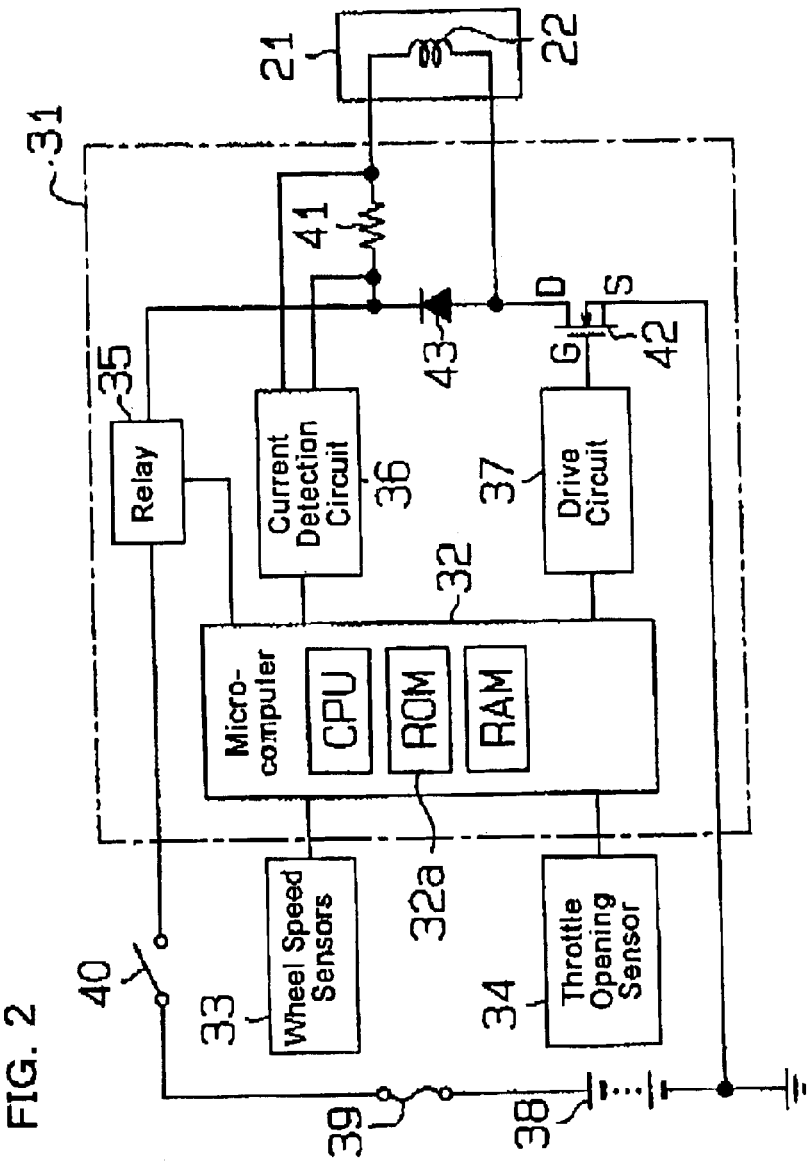
FIG. 2 is a block diagram of an electric hardwired construction of a drive power distribution control device in the first embodiment.

The electric construction of the drive power distribution control device 31 for the four-wheel drive vehicle 11 will be described hereafter with reference to FIG. 2. As shown in FIG. 2, the drive power distribution control device 31 for the four-wheel drive vehicle 11 is composed primarily of a microcomputer 32 incorporating a CPU (central processing unit), a RAM (random access memory), a ROM (read-only memory) 32a, input/output interfaces (not shown) and the like. The ROM 32a constitutes a memory means and stores therein a various kinds of control programs executed by the microcomputer 32, a various kinds of data, a various kinds of characteristic maps and so on. The various kinds of characteristic maps are obtained in advance based on experimental data relying on car models as well as through well-known theoretical calculations and the like. The RAM is those data area where the various kinds of control programs written in the ROM 32a are deployed so that the CPU of the drive power distribution control device 31 can execute various operation processing such as, for example, an operation processing for turning on electricity to the electromagnetic coil 22.

The microcomputer 32 is connected through respective interfaces (not shown) to wheel speed sensors 33, a throttle opening degree sensor 34 constituting acceleration amount manipulation detection means, a relay 35, a current detection circuit 36, a drive circuit 37 and an engine control device (not shown). The vehicle speed sensors 33 are provided for the left and right front wheels 16, 16 and the left and right rear wheels 20, 20. The wheel speed sensors 33 of four in total respectively detect the rotational speeds (i.e., the number of wheel rotations per unit time period) of the front wheels 16, 16 and the rear wheels 20, 20 and send the detected wheel speeds to the microcomputer 32.

The throttle opening degree sensor 34 is connected to a throttle valve (not shown) of the engine 12 and detects the opening degree of the throttle valve (i.e., throttle opening degree θ) as the stepping-on manipulation amount of an accel pedal (not shown) by the driver. The throttle opening degree θ is regarded as an acceleration manipulation amount which represents the driver's will to want to advance or retract the vehicle, and it is presumed that the larger the acceleration manipulation amount is, the stronger the driver wishes to accelerate the vehicle. The throttle opening degree sensor 34 constitutes detection means for the acceleration manipulation amount and sends the detection result (a stepping-on manipulation amount signal) to the microcomputer 32.

Further, the four-wheel drive vehicle is provided with a battery 38, whose both terminals are connected to a series circuit including a fuse 39, an ignition switch 40, the relay 35, a shunt resistance 41, the electromagnetic coil 22 and an field effect transistor 42 (hereafter as "FET 42"). The shunt resistance 41 is connected at both ends thereof to the input side of a current detection circuit 36. This circuit 36 detects a current flowing through the shunt resistance 41 based on a voltage across the shunt resistance 41 and sends the detected current to the microcomputer 32. The microcomputer 32 calculates an electric current to excite the electromagnetic coil 22 based on the current forwarded from the current detection circuit 36. The electromagnetic coil 22 is connected at its both ends to a flywheel diode 43. The flywheel diode 43 is to discharge a counter electromotive force which is generated when the FET 42 goes off. A gate G of the FET 42 is connected to the output side of the drive circuit 37, and a connection point of a source S of the FET 42 with a minus terminal of the battery 38 is grounded.

When the ignition switch 40 is turned on (close operation), the electric power is supplied from the battery 38 to the microcomputer 32 through a power distributor (not shown). Then, the microcomputer 32 executes various control programs such as a drive power distribution program in response to various information (detection signals) obtained from the wheel speed sensors 33 and the throttle opening degree sensor 34 thereby to calculate the amount of a current (command current value) supplied to the electromagnetic coil 22. Then, the microcomputer 32 outputs the calculated command current value to the drive circuit 37. The drive circuit 37 performs the ON/OFF control (i.e., PWM (Pulse Width Modulation) control) of the FET 42 so that the electromagnetic coil 22 is supplied with a current depending on the command current value. Namely, the microcomputer 32 variably controls the distribution of drive power to the front wheels and the rear wheels by controlling the amount of the current supplied to the electromagnetic coil 22. When the ignition switch 40 is turned off (open operation), the power supply to the microcomputer 32 is discontinued.

Figure 3:
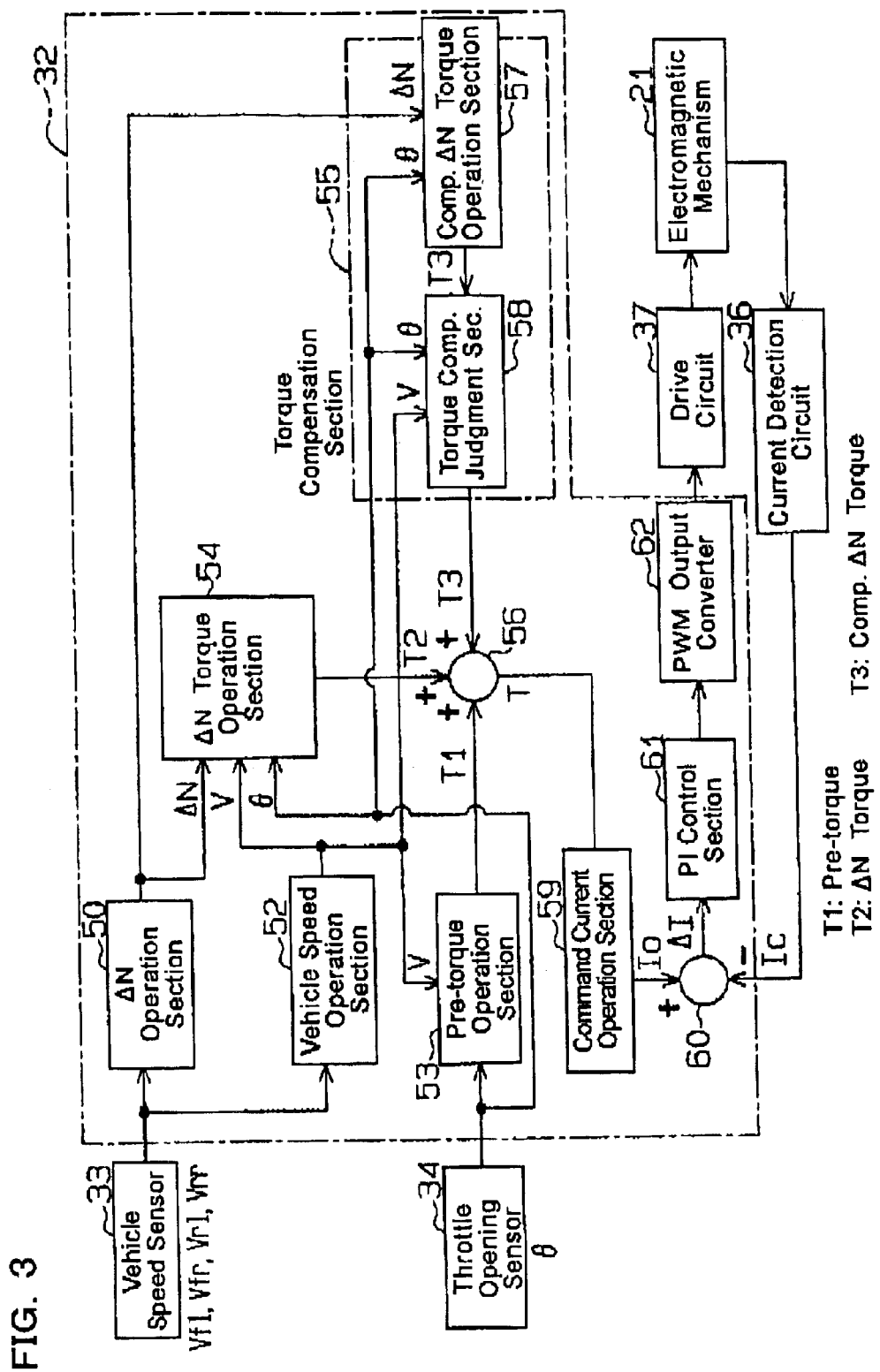
FIG. 3 is a function block diagram representing the functions performed by a microcomputer in the first embodiment.

Next, various functions which the microcomputer 32 executes in accordance with various control programs stored in the ROM 32a will be described with reference to a function block diagram shown in FIG. 3. First, the drive power distribution control by the microcomputer 32 is executed as follows:

Namely, the wheels speeds Vfl, Vfr, Vrl, Vrr of the left and right front wheels 16, 16 and the left and right rear wheels 20, 20 detected by the vehicle wheel sensors 33 are sent to a rotational difference operation section (hereafter as "ΔN operation section 50") and to a vehicle speed operation section 52. The ΔN operation section 50 calculates an average front wheel rotation Nfn (=(Vfl+Vfr)/2) based on the wheel speeds Vfl, Vfr of the left and right front wheels 16, 16 and also calculates an average rear wheel rotation Nrn(=(Vrl+Vrr)/2) based on the wheel speeds Vrl, Vrr of the left and right rear wheels 20, 20. Further, The ΔN operation section 50 calculates a rotational difference ΔN(=|Nfn+Nrn|) from the average front wheel rotation Nfn and the average rear wheel rotation Nrn. The ΔN operation section 50 sends the calculated rotational difference ΔN to a rotational difference torque operation section (hereafter as "ΔN torque operation section 54") and a torque compensation section 55. The ΔN operation section 50 constitutes rotational difference detection means.

The vehicle speed operation section 52 calculates a vehicle speed V based on the taken-in wheel speeds Vfl, Vfr, Vrl, Vrr and sends the calculated vehicle speed V to a pre-torque operation section 53, the ΔN torque operation section 54 and the torque compensation section 55. The vehicle speed operation section 52 constitutes the vehicle speed detection means. The pre-torque operation section 53 has input thereto a throttle opening degree θ from the throttle opening degree sensor 34 in addition to the vehicle speed V from the vehicle speed operation section 52 and calculates a transmission torque (hereafter as "pre-torque T1") depending on the throttle opening degree θ and the vehicle speed V by reference to a pre-torque characteristic map (not shown). The pre-torque characteristic map defines a variation of the pre-torque T1 with increase in the throttle opening degree θ for each of predetermined vehicle speed ranges and is stored in the ROM 32a in advance. The pre-torque operation section 53 sends the calculated pre-torque T1 to an adder 56.

The ΔN torque operation section 54 has input thereto the throttle opening degree θ detected by the throttle opening degree sensor 34, in addition to the vehicle speed V from the vehicle speed operation section 52 and the rotational difference ΔN from the ΔN operation section 50. The ΔN torque operation section 54 obtains a transmission torque (hereafter as "ΔN torque T2") depending on the vehicle speed V and the ΔN torque by reference to a rotational difference torque characteristic map (hereafter as "ΔN torque characteristic map"), not shown. The ΔN torque characteristic map defines a variation of the ΔN torque T2 with increase in the rotational difference ΔN between the front and rear wheels and is stored in the ROM 32a in advance. The ΔN torque operation section 54 sends the calculated ΔN torque to the adder 56.

The torque compensation section 55 has input thereto the throttle opening degree θ detected by the throttle opening degree sensor 34, in addition to the vehicle speed V from the vehicle speed operation section 52 and the rotational difference ΔN from the ΔN operation section 50. The torque compensation section 55 constitutes torque compensation means and calculates a transmission torque (hereafter as "compensation ΔN torque T3") depending on the throttle opening degree θ and the rotational difference ΔN and further, judges whether or not, the compensation ΔN torque T3 is to be added to the pre-torque T1, based on the throttle opening degree θ and the vehicle speed V.

More specifically, the torque compensation section 55 includes a compensation rotational difference torque operation section (hereafter as "compensation ΔN torque operation section 57") and a torque compensation necessity judgment section 58. The compensation ΔN torque operation section 57 has input thereto the throttle opening degree θ and the rotational difference ΔN, and the torque compensation necessity judgment section 58 has input thereto the throttle opening degree θ and the vehicle speed V.

The compensation ΔN torque operation section 57 obtains the compensation ΔN torque T3 by reference to a compensation rotational difference torque characteristic map (hereafter as "compensation ΔN torque characteristic map"), not shown. The compensation ΔN torque characteristic map is defined so that the throttle opening degree θ is further added as a parameter to that which defines a variation of the compensation ΔN torque T3 with increase in the rotational difference ΔN between the front and rear wheels for each of the predetermined vehicle speed ranges. Thus, the compensation ΔN torque characteristic map is set so that the larger the rotational difference ΔN becomes, the larger the compensation ΔN torque becomes.

The torque compensation necessity judgment section 58 judges the necessity for torque compensation, that is, whether or not the compensation ΔN torque T3 is to be added to the pre-torque T1, based on the throttle opening degree θ and the vehicle speed V. In this particular embodiment, when the traveling state of the four-wheel vehicle 11 is presumed to be at the time of starting or to be beginning to start, the torque compensation necessity judgment section 58 judges that the torque compensation is necessary and thus, sends the compensation ΔN torque T3 to the adder 56. On the contrary, when the four-wheel vehicle 11 is presumed not to be beginning to start, the torque compensation necessity judgment section 58 judges that the torque compensation is unnecessary and thus, does not send the compensation ΔN torque T3 to the adder 56.

The torque compensation necessity judgment processing by the torque compensation section 55 (to be more exact, by the torque compensation necessity judgment section 58) will be described later in detail. It is to be noted that the compensation ΔN torque operation section 57 constitutes compensation amount operation means, and that the torque compensation necessity judgment section 58 constitutes first comparison means, second comparison means and traveling state judgment means.

The adder 56 calculates a command torque T (T=T1+T2) by adding the ΔN torque T2 sent from the ΔN torque operation section 54 to the pre-torque T1 sent from the pre-torque operation section 53. Further, when the compensation ΔN torque T3 is sent from the torque compensation section 55, the adder 56 calculates the command torque T (T=T1+T2+T3) by adding the ΔN torque T2 and the compensation ΔN torque T3 to the pre-torque T1. The adder 56 then sends the calculated command torque T to a command current operation section 59.

The command current operation section 59 extracts a current (hereafter as "base command current I0") corresponding to the command torque T sent from the adder 56 by reference to a base command current characteristic map (not shown). The base command current characteristic map is to convert the command torque T into a corresponding base command current I0 and defines a variation in the current to be supplied to the electromagnetic coil 22 with a variation in the command torque T. Then, the command current operation section 59 compensates the base command current I0 by a compensation coefficient corresponding to the vehicle speed V and sends the compensated base command current I0 to a subtractor 60.

The subtractor 60 has input thereto a coil current Ic of the electromagnetic coil 22 detected by the current detection circuit 36 in addition to the base command current I0 from the command current operation section 59. The subtractor 60 sends a differential current ΔI (ΔI=|I0−Ic|) between the base command current I0 and the coil current Ic to a PI (Proportional Integral) control section 61. The PI control section 61 calculates a PI control value based on the differential current ΔI sent from the subtractor 60 and sends the PI control value to a PWM (Pulse Width Modulation) output converter 62.

The PWM output converter 62 executes a PWM operation depending on the PI control value sent thereto and sends the result of the PWM operation to the drive circuit 37. The drive circuit 37 supplies the electromagnetic coil 22 of the electromagnetic clutch mechanism 21 with an appropriate current depending on the result of the PWM operation sent from the PWM output converter 62. Thus, the clutch plates of the electromagnetic clutch mechanism 21 are brought into friction engagements with an engagement force depending on the current supplied thereto.

In this manner, the microcomputer 32 optimally controls the transmission torque between the front wheels 16 and the rear wheels 20 by variably controlling the base command current I0 in dependence upon the rotational difference ΔN, the vehicle speed V and the throttle opening degree θ, that is, in dependence upon the traveling state of the four-wheel drive vehicle 11.

Next, a torque compensation necessity judgment processing in the torque compensation section 55 of the microcomputer 32 will be described in detail in accordance with a flow chart shown in FIG. 4. This flow chart is executed in accordance with a torque compensation control program which is stored in the ROM 32 beforehand. The torque compensation control program is repetitively executed at a predetermined control interval (sampling interval). In this particular embodiment, each step is abbreviated as "S".

Figure 4:
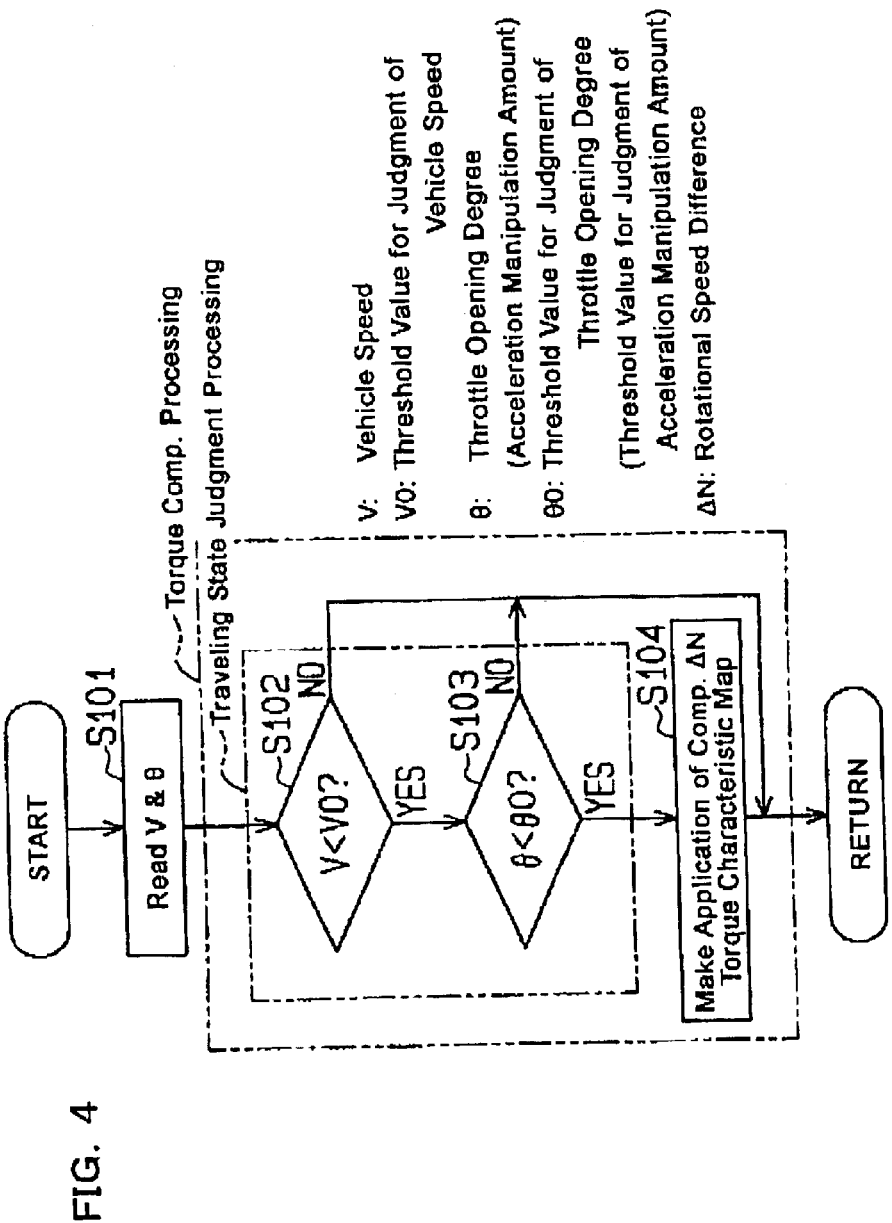
FIG. 4 is a flow chart indicative of a judgment processing for the necessity of torque compensation in the first embodiment.

As shown in FIG. 4, in the torque compensation necessity judgment processing, the torque compensation necessity judgment section 58 of the torque compensation section 55 reads the vehicle speed V calculated by the vehicle speed operation section 52 and the throttle opening degree θ detected by the throttle opening degree sensor 34 (S101) and proceeds to a processing at S102.

At S102, the torque compensation necessity judgment section 58 judges whether or not, the read vehicle speed V is smaller than a predetermined vehicle speed judgment threshold value V0. When the vehicle speed V is judged to be larger than the threshold value V0 (No at S102), the torque compensation necessity judgment section 58 presumes that the four-wheel drive vehicle 11 is not at the starting, namely not to be beginning to start, and thus judges the torque compensation to be unnecessary thereby to terminate the processing. As a result, the command torque T is determined to be an ordinary value (T=T1+T2) which is made by adding the ΔN torque T2 calculated by the ΔN torque operation section 54 to the pre-torque T1 calculated by the pre-torque operation section 53, whereby an ordinary torque distribution control for an ordinary four-wheel drive traveling is carried out without executing the torque compensation.

When the vehicle speed V is judged to be smaller than the threshold value V0 (Yes at S102), the torque compensation necessity judgment section 58 advances its processing to S103. At S103, the torque compensation necessity judgment section 58 judges whether or not, the read throttle opening degree θ is smaller than a throttle opening degree judgment threshold value θ0 (i.e., acceleration manipulation amount judgment threshold value). When throttle opening degree θ is judged to be larger than the threshold value θ0 (No at S103), the judgment section 58 presumes that the four-wheel drive vehicle 11 is not at the starting, and thus judges the torque compensation to be unnecessary thereby to terminate the processing. As a result, he command torque T is determined to be the ordinary value (T=T1+T2) which is made by adding the ΔN torque T2 calculated by the ΔN torque operation section 54 to the pre-torque T1 calculated by the pre-torque operation section 53, whereby the ordinary torque distribution control for the ordinary four-wheel drive traveling is carried out without executing the torque compensation.

However, when the throttle opening degree θ is judged to be smaller than the threshold value θ0 thereof (Yes at S103), the judgment section 58 judges that the four-wheel drive vehicle 11 is at the starting or is beginning to start and hence that the torque compensation is necessary. In general, the vehicle speed V and the throttle opening degree θ respectively take very small values during a creep traveling or during a very slow speed manipulation at the starting of the four-wheel drive vehicle 11, and therefore, it is possible to presume whether or not, the four-wheel drive vehicle 11 is at starting, based on the vehicle speed V and the throttle opening degree θ. Subsequently, torque compensation necessity judgment section 58 chooses to use the compensation ΔN torque characteristic map and sends the adder 56 the compensation ΔN torque T3.

Consequently, the command torque T is set to a value (T=T1+T2+T3) which is made by adding the ΔN torque T2 and the compensation ΔN torque T3 to the pre-torque T1. Thus, the microcomputer 32 controls the friction engagement force of the electromagnetic clutch mechanism 21 constituting the drive power transmission device 17 so that the command torque so set is transmitted to the rear wheels 20. The larger the rotational difference ΔN becomes, the larger the compensation ΔN torque T3 becomes, and therefore, the torque compensation, that is, the torque distribution amount (drive power distribution amount) to the rear wheels 20 is increased in dependence on the slip or skid amount.

In this manner, If the rotational difference ΔN is generated with the vehicle speed V and the throttle opening degree θ being respectively sufficiently small (i.e., V<V0 and θ<θ0), it is the case that the front wheels 16 is slipping at the starting of the four-wheel drive vehicle 11, and therefore, the compensation ΔN torque T3 depending on the rotational difference ΔN is added to the pre-torque T1. Accordingly, the front wheels (drive wheels) 16 are restrained from, or relieved of, slipping at the starting (e.g., during a creep traveling or a slow speed traveling) on an excessively small "μ" road (i.e., on a road whose friction coefficient of the road surface is excessively small) such as, for example, an "eisbahn" or the like. For instance, during a creep traveling or a slow speed traveling, the throttle opening degree θ and the engine torque transmitted to the front wheels 16 remain respectively vary small values. However, with the front wheels 16 being on the excessively small "μ" road, even such a small torque at the starting could cause the front wheels 16 to slip. In the instant embodiment, the torque distribution amount to the rear wheels 20 is increased taking into account the situation that the vehicle travels on such an excessively small "μ" road which causes even a small torque to slip the front wheels 16. Therefore, even if not only the front wheels 16 but also the rear wheels 20 are on the excessively small "μ" road, the torque transmitted to the front wheels 16 is made small by the torque which is transmitted to the rear wheels 20, whereby the front wheels 16 can be restrained from slipping.

Accordingly, the following effects or advantages (1) through (5) can be achieved in the foregoing first embodiment.

(1) When it is judged that the traveling state of the four-wheel drive vehicle 11 is at the starting, the drive power transmission rate of the drive power transmission device 17 is controlled so that the drive power distributed to the rear wheels 20 is made larger than the ordinary value for the ordinary four-wheel drive traveling. In other words, at the starting of the vehicle, not only the ΔN torque T2 but also the compensation ΔN torque T3 is added to the pre-torque T1. Therefore, the front wheels can be restrained from skidding (or slipping) at the starting of the vehicle. Further, it can be avoided that a tight-corner phenomenon is produced by distributing too large drive power to the driven wheels at the early stage of the vehicle starting, and the performance in starting with a small acceleration (i.e., in a small acceleration manipulation) can be improved.

(2) It is judged that the traveling state of the four-wheel drive vehicle is at the starting when the vehicle speed V and the throttle opening degree θ are both smaller than the vehicle speed judgment threshold value V0 and the throttle opening degree judgment threshold value θ0 respectively. Thus, the judgment of whether the four-wheel drive vehicle is beginning to start or not can be made reliably.

(3) The compensation ΔN torque T3 is calculated based on the differential rotational speed ΔN. Namely, the compensation ΔN torque T3 is calculated in dependence on the slip amount of the front wheels 16. Then, the compensation ΔN torque T3 is added to the ordinary value (T1+T2) when the vehicle is beginning to start. Accordingly, it can be avoided that the torque distribution to the rear wheels 20 falls in short or goes to excess, and this ensures the traveling stability of the four-wheel drive vehicle 11 at the starting.

(4) The compensation ΔN torque characteristic map used in obtaining the compensation ΔN torque T3 based on the differential rotational speed ΔN is stored in the ROM 32a in advance. At the starting of the four-wheel drive vehicle 11, the ΔN torque T3 is obtained by making reference to the compensation ΔN torque characteristic map based on the differential rotational speed ΔN. Thus, it can be realized to obtain the compensation ΔN torque T3 which is appropriate to the differential rotational speed ΔN (i.e., the slip amount).

(5) The compensation ΔN torque T3 is added to the pre-torque T1 only at the starting of the vehicle. This hardly affects the control for avoiding the tight-corner braking phenomenon.

(Modifications of the First Embodiment)

The four-wheel drive vehicle 11 to which the first embodiment is to be applied can be any of that with an automatic transmission (AT) or that with a manual transmission (MT). And, in the four-wheel drive vehicle 11 of either type, it is possible to restrain the front wheels 16 (drive wheels) from slipping at the starting of the vehicle, provided that no creep traveling is taken into consideration in the case of the vehicle with the manual transmission (MT).

In the first embodiment, the present invention is embodied to the drive power distribution device 31 of the four-wheel drive vehicle 11 with the internal combustion engine 12 as a prime mover therefor. However, it may be embodied in a drive power distribution control device of a parallel-type hybrid vehicle with two prime movers composed of the internal combustion engine 12 and an electric motor (not shown). This parallel-type is know as a system for driving wheels by the engine 12 and the electric motor, wherein the motor is brought into operation to assist the engine 12 during the starting or acceleration motion burdening the engine 12 with a large load. In this modified form, the same effect as that in the first embodiment is accomplished.

Further, the present invention may be embodied in a drive power distribution control device of a series-type hybrid vehicle with two prime movers composed of the internal combustion engine 12 and an electric motor (not shown). This series-type is know as a system for driving the wheels only by the electric motor, wherein the drive power of the engine 12 is only used to drive an alternator (not shown) provided therein. The alternating current power made by the alternator is converted by an inverter (not shown) into the direct current power to be charged into a battery (not shown), and the direct current power from the battery is again converted into the alternating current power to be supplied to the electric motor. In the four-wheel vehicle of this series-type, the manipulation amount of the accel pedal is increased at the time of acceleration, which increases the power supply to the electric motor. That is to say, the increase or decrease in the manipulation amount of the accel pedal makes the direct current power to the electric motor increase or decrease. The manipulation amount of the accel pedal represents an acceleration manipulation amount that the driver wants to accelerate. In this modified form, the same effect as that in the first embodiment is achieved. The throttle opening degree θ (acceleration manipulation amount) in the aforementioned first embodiment is to read as the manipulation amount of the accel pedal which adjusts the increase or decrease in the direct current power supplied to the electric motor.

Although in the foregoing first embodiment, the present invention is embodied by the drive power distribution control device 31 of the four-wheel drive vehicle 11 having the internal combustion engine 12 as the prime mover, it may be embodied in an electric vehicle whose wheels are driven by means of the drive power of an electric motor. In the electric vehicle of this type, the direct current power supplied to the motor is increased or decreased with increase or decrease in the manipulation amount of the accel pedal, for example. In this modified form, the same effect as that in the first embodiment is attained. The throttle opening degree θ (acceleration manipulation amount) in the aforementioned first embodiment is to read as the manipulation amount of the accel pedal which adjusts the increase or decrease in the direct current power supplied to the electric motor.

Further, although in the foregoing embodiment, the present is embodied by the drive power distribution control device 31 of the four-wheel drive vehicle 11 of the front wheel drive base, it may be embodied by the drive power distribution control device 31 of the four-wheel drive vehicle 11 of the rear wheel drive base. In this modified case, the drive power distribution control device 31 is designed to control the torque distribution amount to the front wheels.

(Second Embodiment)

Figure 5:
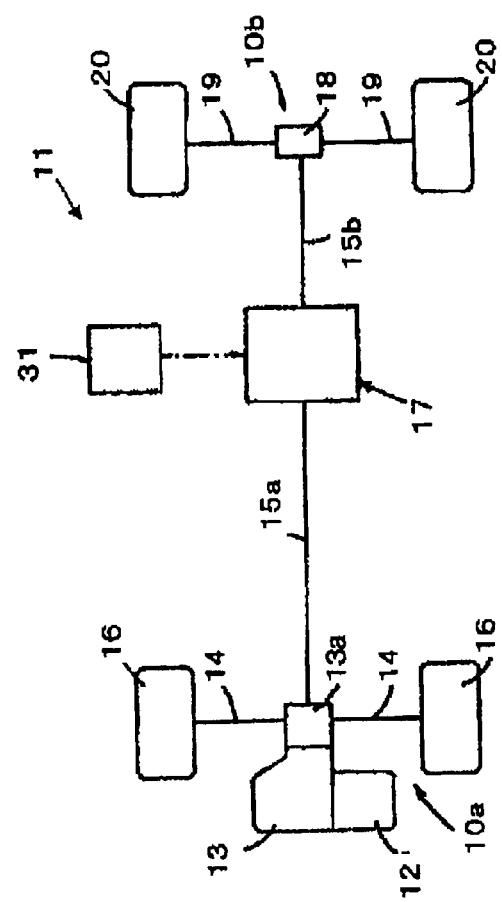
FIG. 5 is a schematic diagram showing the general construction of a four-wheel drive vehicle according to the second embodiment of the present invention.

Next, the second embodiment will be described with reference to FIGS. 5 to 9. FIG. 5 schematically shows the general construction of a four-wheel drive vehicle having a drive power distribution control device according to the present invention. FIG. 5 shows many parts identical or corresponding in configuration and function to those shown in FIG. 1. More specifically, a primary drive mechanism 10a is composed of an internal combustion engine 12, a transaxle 13, a pair of front axles 14, 14 and front wheels 16, 16. These components have the same constructions and functions as those of the foregoing first embodiment designated by the same reference numerals in FIG. 1, and therefore, the descriptions of those parts in the foregoing first embodiment are incorporated into this second embodiment by reference to constitute a part thereof. In FIG. 5, a front differential 13a is illustrated separated from a transaxle 13, while in FIG. 1, such a front differential is not illustrated as being incorporated within the transaxle 13.

Similarly, a secondary drive mechanism 10b is composed of a rear differential 18, a pair of rear axles 19, 19 and rear wheels 20, 20. These components have the same constructions and functions as those of the foregoing first embodiment designated by the same reference numerals in FIG. 1, and therefore, the descriptions of those parts of the foregoing first embodiment are incorporated into this second embodiment by reference to constitute a part thereof.

Further, the four-wheel vehicle 11 further includes a drive power transmission device 17, first and second proper shafts 15a, 15b and a drive power distribution control device 31, which respectively correspond in function to those with the same or corresponding reference numerals shown in FIG. 1. In this particular second embodiment, the first and second proper shafts 15a, 15b are divided forward and rearward, and the drive power transmission device 17 is arranged therebetween.

As shown in FIG. 6, the drive power transmission device 17 is constituted by a clutch mechanism of the electromagnetic pilot type and is interposed between the first and second propeller shafts 15a, 15b. The drive power transmission device 17 is composed of an outer casing 120a, an inner shaft 120b, a main clutch mechanism 120c, a pilot clutch mechanism 120d and a cam mechanism 120e. The outer casing 120a comprises a front housing 121a of a bottomed cylindrical shape and a rear housing 121b which is secured to a rear opening end portion of the front housing 121a through threaded engagement. The rear housing 121b is provided with an outward flange portion 121b1, which closes a rear end opening portion of the front housing 120a. The first propeller shaft 15a is bodily connected with one or front end of the front housing 120a for drive power transmission.

The inner shaft 120b is rotatably carried at an innermost wall portion 121a1 of the front housing 121a and at a cylindrical portion 121b2 of the rear housing 121b, passing through an inner bore of the rear housing 121b. The inner shaft 120b is prevented at the innermost wall portion 121a1 of the front housing 121a from coming off and is fluid-tightly carried at the cylindrical portion 121b2 of the rear housing 121b. The second propeller shaft 15b is in spline engagement with the inner shaft 120b and is drivingly connected therewith for integral rotation.

The main clutch mechanism 120c comprises a wet-type multiple disc clutch having a plurality of clutch plates, whose inner plates 122a are assembled engaged with a spline formed at the external surface of the inner shaft 120b, and whose outer plates 122b are assembled engaged with a spline formed at the internal surface of the front housing 121a. Each inner plate 122a and each outer plate 122b are located in a alternate fashion and are arranged to be movable axially of the inner shaft 120b. The pilot clutch mechanism 120d includes a multiple clutch 123, an electromagnetic coil 124 and an armature 125. The cam mechanism 120e includes a first cam member 126, a second cam member 127 and a number of cam followers 128 (one only shown).

The multiple clutch 123 is located at one side of the rear housing 121b and is assembled with each inner plate being engaged with a spline formed at the external surface of the first cam member 126 and with each outer plate being engaged with a spline formed at the internal surface of the front housing 121a. Each inner plate and each outer plate are arranged in an alternate fashion and are assembled to be movable axially of the inner shaft 120b. The first cam member 126 is assembled to be rotatable on the external surface of the inner shaft 120b, while the second cam member 127 is spline-engaged on the external surface of the inner shaft 120b to be movable axially only.

The electromagnetic coil 124 is embed into one end of a yoke 124a and is assembled rotatably bodily with the yoke 124a but relatively to the rear housing 121b within an annular spacing formed at the other side of the rear housing 121b. The electromagnetic coil 124 is in position to face the other end surface of the rear housing 121b. The armature 125 takes the form of an annular disc and is in position to face one side of the multiple clutch 123. The armature 125 is spine-engaged with the internal surface of the front housing 121a and is movable axially only of the inner shaft 120b.

The first cam member 126 taking the form of an annular disc is assembled rotatably on the external surface of the inner shaft 120b and axially carried on the rear housing 121b through a thrust bearing. The second cam member 127 also taking the form of an annular disc is assembled on the external surface of the inner shaft 120b and is engaged with a spline formed on the external surface thereof. The second cam member 127 is in position to face the other side of the main clutch 120c and is movable axially of the inner shaft 120b. The cam followers 128 are fit in respective cam grooves formed at the facing surfaces of the cam members 126, 127.

The drive power transmission device 17 as constructed above is operated by applying an electric current to the electromagnetic coil 124 constituting the pilot clutch mechanism 120d. With the electric current being applied to the electromagnetic coil 124, a magnetic force is generated to attract the armature 125. Thus, the armature 125 presses the multiple clutch 123 to bring the same into friction engagement. The first cam member 126 is made bodily with the front housing 121a of the outer casing 120a, so that relative rotation occurs between the first cam member 126 and the second cam member 127. As a result, the cam followers 128 are operated to press the both cam members 126, 127 to move apart from each other. Thus, the second cam member 127 is pressed against the main clutch 120c thereby to bring the same into friction engagement.

Consequently, the outer casing 120a and the inner shaft 120b are drivingly coupled to be able to transmit the drive power, whereby the drive power is transmitted between the outer casing 120a and the inner shaft 120b. This brings the four-wheel drive vehicle 11 into the state of four-wheel drive. In the drive power transmission device 17, the drive power (i.e., transmission torque) transmitted between the outer casing 120a and the inner shaft 120b is increased in dependence on the magnitude in friction engagement of the main clutch 120c.

In the drive power transmission device 17, the friction engagement force generated in the pilot clutch mechanism 120d is augmented by the cam mechanism 120e to be transmitted to the main clutch 120c. Therefore, the friction engagement force of the main clutch 120c is increased or decreased in proportion to the electric current applied to the electromagnetic coil 124. This enables the increase or decrease of the transmission torque to be adjusted by controlling the electric current applied to the electromagnetic coil 124. The drive power distribution control device 31 is given a function to control the transmission torque in dependence upon the state of the vehicle 11.

Figure 7:
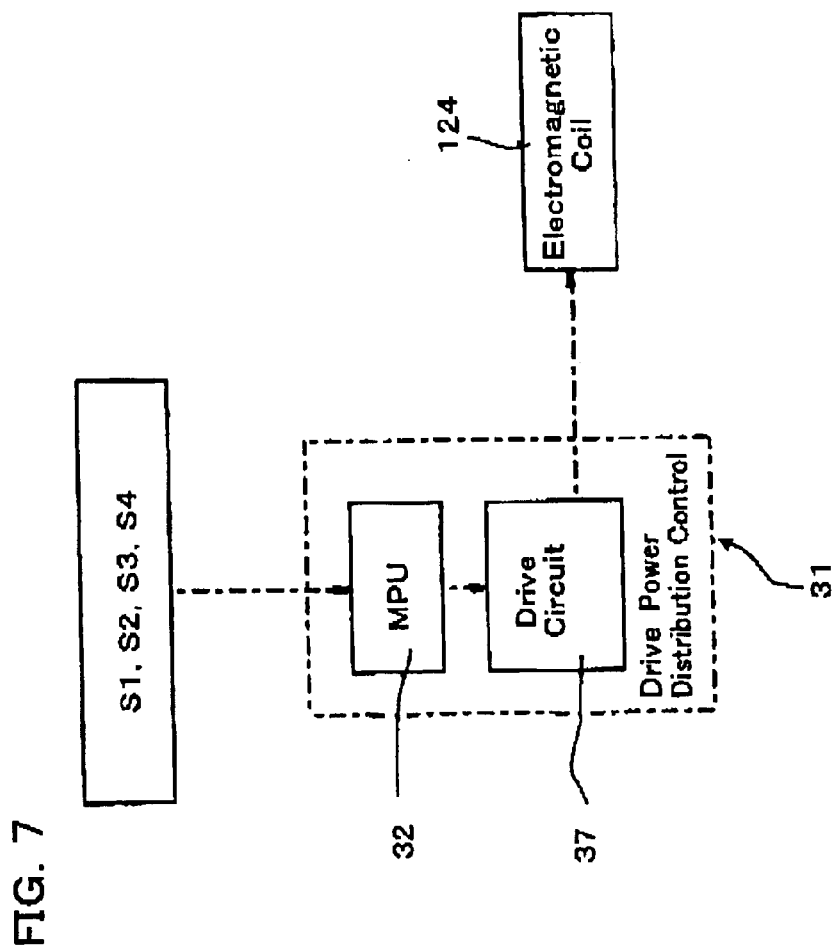
FIG. 7 is a block diagram showing the general construction of a drive power distribution control device in the second embodiment.

As shown in FIG. 7, the drive power distribution control device 31 is connected to a throttle opening degree sensor S1, a vehicle speed sensor S2, wheel speed sensors S3 and a 4WD switch sensor S4 for detecting the state of a 4WD switch (not shown) and the like, and is provided with a microprocessor or microcomputer 32 and a drive circuit 37. The microcomputer 32 incorporates therein a CPU and memories for storing control programs and various data. The microcomputer 32 takes detection signals output from the aforementioned sensors S1 to S4 thereinto through interfaces (not shown) and controls an electric current applied to the electromagnetic coil 124, whereby the transmission torque output from the drive power transmission device 17 is controlled to constitute a four-wheel drive state suitable to the traveling state of the vehicle.

The microcomputer 32 calculates a transmission torque based on the traveling state of the vehicle 11 and outputs the calculated transmission torque as a command signal to the drive circuit 37 through an interface (not shown). The drive circuit 37 controls the electric current applied to the electromagnetic coil 124 based on the command signal from the microcomputer 32.

FIGS. 8(a), 8(b) and 8(c) show base data used in calculating the transmission torque. The transmission torque T is the sum of a vehicle speed responsive torque ST which has been set in relation to the throttle opening degree θ and the vehicle speed V and a rotational difference responsive torque ΔNT which has been set in relation with a front-rear wheel speed difference ΔN. The graph in FIG. 8(a) represents the vehicle speed responsive torque ST, and the graph in FIG. 8(b) represents the rotational difference responsive torque ΔNT. In this particular embodiment, a four-wheel drive state control for controlling the transmission torque of the drive power transmission device 17 to the transmission torque T during the four-wheel drive traveling is called as an "ordinary control".

In the four-wheel drive vehicle 11 in this particular embodiment, a torque-down control for lowering the transmission torque than that in the ordinary control is performed in a selective manner with the ordinary control in order to obviate a torque shock which is likely to take place when the four-wheel drive state is made up or established. Further, in this particular embodiment, the degree to which the transmission toque is lowered in the torque-down control is approximately half the transmission torque in the ordinary control. Additionally, in this particular embodiment, a slow returning means is provided for smoothly proceeding from the torque-down control to the ordinary control. FIG. 8(c) represents the relation of the transmission torque to time in transit from the torque-down control to the ordinary control.

In the four-wheel drive vehicle as constructed above, the drive power distribution control device 31 selectively executes the ordinary control and the torque-down control while the four-wheel drive vehicle 11 is in the four-wheel drive state. FIG. 9 shows the flow chart which enables the microcomputer 32 of the drive power distribution control device 31 to selectively execute the ordinary control and the torque-down control.

The microcomputer 32 begins to execute the control program when the 4WD switch S4 is turned ON and reads the engine rotational speed Ne and the vehicle speed V at S201 to then proceeds to S202. The microcomputer 32 at S202 judges whether or not, the vehicle speed V is smaller than a threshold value THV therefor. The microcomputer 32 advances its processing to S203 if the vehicle speed V is smaller than the threshold value THV or to S211 if it is larger than the threshold value THV. The microcomputer 32 at S203 judges whether or not, the engine rotational speed Ne is larger than a threshold value THV therefor. The microcomputer 32 proceeds to S204 when judging the engine rotational speed Ne to be larger than the threshold value THV or to S211 when judging the engine rotational speed Ne to be smaller than the threshold value THV.

The microcomputer 32 at step S204 makes the torque-down flag ON and clears a timer counter (not shown) and executes the torque-down control at S205. The microcomputer 32 repetitively executes this control program. When the microcomputer 32 executing this control program judges at S202 that the vehicle speed V is larger than the threshold value THV, or judges at S203 that the engine rotational speed Ne is smaller than the threshold value THV, it proceeds to S211 to judge the state of the torque-down flag. When judging at S211 that the torque-down flag is ON, the microcomputer 32 makes the timer counter up at S212 and advances the routine to S213. It is to be noted that the threshold values THVs at S202 and S203 are set to different values.

Then, the microcomputer 32 at S213 judges whether or not, the count time of the timer counter exceeds a preset T time and if not, continues the torque-down control at S214. On the contrary, when judging that the count time of the time counter has exceeded the preset T time, the microcomputer 32 moves to S215 to make the torque-down flag OFF, clear the timer counter and return the control mode slowly from the torque-down control to the ordinary control. Further, when judging at S211 that the torque-down flag is in OFF state, the microcomputer 32 advances its processing to S216 to continue the ordinary control.

As described above, while the four-wheel drive vehicle 11 is in the four-wheel drive state, the transmission torque output from the drive power transmission device 17 is controlled selectively under the ordinary control or the torque-down control. The transmission torque under the ordinary control is maintained to an ordinary level needed for the ordinary four-wheel drive, while the transmission torque under the torque-down control is reduced by a predetermined amount than the ordinary level. Therefore, the large transmission torque output from the drive power transmission device 17 is reduced when the quick starting is made with the drive power of the engine 12 being kept at a high power output. This advantageously prevents a large torque shock from being generated or restrains it to a smaller level though such a large torque shock otherwise be likely to be generated when the ordinary control is continued at the quick starting.

Although the drive power transmission means provided for the four-wheel drive vehicle 11 in the second embodiment is an electromagnetic-type drive power transmission means (drive power transmission device 17), it is not limited to the transmission means of the electromagnetic type. The transmission means of a hydraulic type may be employed instead of that of the electromagnetic-type.

(Third Embodiment)

Next, the third embodiment will be described with reference to FIGS. 10 to 17. FIG. 10 schematically shows the general construction of a four-wheel drive vehicle 11 having a drive power distribution control device according to the third embodiment. In FIG. 10, the parts identical or corresponding in configuration and function to those shown in FIGS. 1 and 5 are denoted by the same reference numerals as used in these figures. In particular, the construction shown in FIG. 10 more resembles that shown in FIG. 5 rather than that shown in FIG. 1. Therefore, the descriptions previously given with reference to FIGS. 1 and 5 are incorporated by reference into the description of the construction shown in FIG. 10 and constitute a part of the third embodiment.

FIG. 10 more specifically shows the construction of the four-wheel drive vehicle 11 by providing a drive mode change-over switch 1 and an ignition switch 3. The drive mode change-over switch 1 has three change-over positions "2WD, AUTO and LOCK" which are manually selectable by the driver and inputs the selected mode information or signal into a drive power transmission control device 31 labeled as "ECU". This drive mode change-over switch 1 is referred to as a 4WD switch S4 (FIG. 7) in the foregoing second embodiment and therefore, has the same function as the 4WD switch S4. Similarly, the ignition switch 3 is shown in FIG. 2 by the reference numeral 40 and performs the same function as that denoted by the numeral 40 in FIG. 2. Therefore, the description concerning the ignition switch 40 in the foregoing first embodiment and the description concerning the 4WD switch S4 in the foregoing second embodiment are incorporated by reference into this third embodiment to constitute parts thereof.

FIG. 11 schematically shows the detail construction of a drive power transmission device 17 shown in FIG. 10. The drive power transmission device 17 is arranged between first and second propeller shafts 15a, 15b and operates to vary the amount of the drive power which is transmitted from an internal combustion engine 12 to a rear differential 18 in dependence upon a control signal from a drive power transmission control device 31 labeled as "ECU". Those illustrated at the upper half of FIG. 6 are schematically shown in FIG. 11, and the mechanism shown in FIG. 11 has substantially the same in construction and function as that shown in FIG. 6. Therefore, the description concerning the drive power transmission device 17 in the foregoing second embodiment is incorporated by reference into this third embodiment to constitute a part thereof.

FIG. 11 more specifically illustrates the construction around a pilot clutch mechanism 120d than FIG. 6 does. That is, the pilot clutch mechanism 120d is an electromagnetic clutch which is composed of an electromagnet 113, a friction clutch 114, an armature 125 and a yoke 124a. The annular electromagnet 113 comprises an electromagnetic coil 124 wound around the rotational axis L and, with itself being fit in the yoke 124a, is inserted inside an annular cave 121d through a predetermined clearance or spacing. The yoke 124a is secured to a vehicle body (not shown) to be rotatable relative to the rear cover 121b. The rear cover 121b is formed by bodily fabricating an inner cylindrical member taking the form of an almost L-letter in a radial cross-section and made of a magnetic material, an outer cylindrical member made of a magnetic material and arranged externally of the inner cylindrical member, and an annular isolation member 111 made of a non-magnetic material fixed between the inner and outer cylindrical members.

The friction clutch 114 is of a wet-type multiple disc type having a plurality of clutch plates which comprise outer clutch plates 114a and inner clutch plates 114b. Each outer clutch plate 14a is spline-engaged with the internal surface of a front housing 121a and is assembled to be movable axially. Each inner clutch plate 114b is spline-engaged with the external surface of a first cam member 126 constituting the cam mechanism 120e and is assembled to be movable axially. An annular armature 125 is spline-engaged with the internal surface of the front housing 121a and is assembled to be movable axially. The annular armature 125 is arranged at a front side of the friction clutch 114 in face-to-face relation.

In the pilot clutch mechanism 120d as constructed above, by applying an electric current to the electromagnetic coil 124 to excite the electromagnet 113, there is formed a loop-like recirculating magnetic path which recirculates through a course made by the electromagnet 113 as a starting point, the rear cover 121b, the friction clutch 114 and the armature 125. The exciting electric current flowing through the electromagnetic coil 124 of the electromagnet 113 is controlled to a predetermined current value which is set under a duty control operation performed in the drive power distribution control device 31, as will be described later in detail.

The intermittent application of the exciting electric current to the electromagnetic coil 124 of the electromagnet 113 is made through the switching manipulation of the drive mode change-over switch 1 shown in FIG. 10, wherein three drive modes are selectable. The change-over switch 1 is provided by a driver's seat within a vehicle cabin to enable the driver to manipulate it easily. In case that the drive power distribution control device 31 is designed to operate in a second drive mode (AUTO mode) only, the change-over switch 1 may be omitted.

In the drive power transmission device 17 as constructed above, when the electromagnetic coil 124 of the electromagnet 113 constituting the pilot clutch mechanism 120d is not excited or not supplied with an exciting electric current, no magnetic path is formed, and the friction clutch 114 is maintained disengaged, so that the pilot clutch mechanism 120d is out of operation. In this state, the first cam member 126 constituting the cam mechanism 120e is brought into the state that it can be rotated together with the second cam member 127 through the cam followers 128. This makes the main clutch mechanism 120c disengaged, so that the vehicle 11 is put in the second drive mode (2WD mode) for two-wheel drive.

On the other hand, when the electromagnetic coil 124 of the electromagnet 113 is supplied with an exciting electric current, the loop-like recirculating magnetic path starting from the electromagnet 113 is formed in the clutch mechanism 120d, and the electromagnet 113 generates a magnetic force to attract the armature 125. Thus, the armature 125 is moved to press the friction clutch 114, and the first cam member 126 of the cam mechanism 120e is brought into driving connection with the outer casing 120a. This makes the relative rotation between the first cam member 126 and the second cam member 127, whereby a thrust force is generated in the cam mechanism 120e to move both cam members 127, 126 away from each other.

Consequently, the second cam member 127 is pressed against the main clutch mechanism 120c thereby to press the same in cooperation with the innermost wall portion of the front housing 121a and brings the main clutch mechanism 120c in friction engagement in dependence upon the friction engagement force of the friction clutch 114. Therefore, the torque transmission takes place between the outer casing 120a and the inner shaft 120b, and the vehicle 11 is put into operation in the second drive mode (AUTO mode) which is such four-wheel drive that the first and second propeller shafts 15a, 15b are between a disengagement state and a lock state. In this second drive mode, the rate of the drive power distribution between the front and rear wheels can be controlled to range from "100:0" (i.e., the two-wheel drive state) to the lock state.

Also in the second drive mode, the supply of the exciting electric current to the electromagnetic coil 124 of the electromagnet 113 is duty-controlled based on the wheel rotation sensors 33, the throttle opening degree sensor 34, an accel pedal stepping-on sensor (not shown) and the like, namely, in dependence upon the vehicle traveling state and the road surface state, thereby to control the friction engagement force of the friction clutch 114 (i.e., the transmission torque to the rear wheels).

When the exciting electric current to the electromagnetic coil 124 of the electromagnet 113 is increased to a lock current of a predetermined value, the attractive force of the electromagnet 113 toward the armature 125 is increased, which is hence attracted strongly to enhance the friction engagement force of the friction clutch 114, and the relative rotation is further increased between the cam members 126 and 127. As a result, the cam followers 128 further enforces the pressing force against the second cam member 127 thereby to bring the main clutch mechanism 120c into the complete connection state. Thus, the vehicle 11 is put into operation in the third drive mode (LOCK mode) which is such four-wheel drive that the first and second propeller shafts 15a, 15b are kept in a lock state.

The drive power distribution control device 31 labeled as "ECU" is composed of a CPU or microcomputer, memories, input/output interfaces, A/D converters (all not shown) and a drive circuit 37, a current detection circuit 36 (shown in FIG. 12) and the like. Briefly, a hardwired configuration which is the same or corresponding to that shown in FIG. 2 relating to the foregoing first embodiment is employed for this purpose. Then, the drive power distribution control device 31 is tailored by being operated in accordance with a predetermined control program stored in the memories thereof so as to execute a feedback control loop processing operation as illustrated in FIG. 12.

To be short, when the throttle opening degree signal θ and the wheel speed signals N1–N4 are input to the microcomputer, the generation of a transmission torque command value is carried out by a command torque generation section 51 based on these signal data input thereto, as described later. Thereafter, a torque current converter 59 executes a processing for converting the transmission torque command value generated by the command toque generation section 51 into a corresponding current. Since a current command value is generated for a target torque, an adder 56 calculates the difference between the current command value and a current detection signal Icp detected by the current detection circuit 36. The current difference thus obtained is input a PI control section 61, wherein a proportional integral control is performed to calculate an exciting current needed actually.

Then, the exciting current is put into a pulse width modulation processing in a PWM output converter 62 to perform a switching control of a switching element 42 through a drive circuit 37. This results in applying an exciting current to the electromagnetic coil 124 of the electromagnet 113 which is connected in series between the switching element 42 and a battery (B). Thus, as described earlier, the loop-like recirculating path starting from the electromagnet 113 is formed, which thus attracts the armature 125. Therefore, the electromagnetic clutch of the pilot clutch mechanism 120d is brought into operation, whereby the drive power input from the first propeller shaft 15a is transmitted to the second propeller shaft 15b.

The generation of the transmission torque command value by the command torque generating section 51 will be described with reference to FIGS. 12 to 16.

As shown in FIG. 12, the command torque generation section 51 is composed of a pre-torque operation section 53, a ΔN torque operation section 54 and a pre-torque modification section 55. The pre-torque operation section 53 has a function of calculating a pre-torque T1 based on the throttle opening degree signal θ input from the throttle valve degree sensor 34 and the vehicle speed V input from the pre-torque modification section 55 and through a map processing referred to later. Herein, "pre-torque" means a transmission torque set to the rear wheels 20, 20 when the vehicle 11 starts.

The ΔN torque operation section 54 has a function of calculating a ΔN torque T2 based on the vehicle speed V and a slip amount ΔN both calculated by the pre-torque modification section 55 and through a map processing. Herein, "ΔN torque T2" means the transmission torque to the rear wheels 20, 20 which is set through the foregoing feedback control loop processing.

The pre-torque modification section 55 has a function of calculating the vehicle speed V and the slip amount ΔN based on the throttle opening degree signal θ input from the throttle opening degree sensor 34 and the wheel speed signals N1–N4 input respectively from the wheel speed sensors 33 and also has another function of executing an operation processing to modify a pre-torque map. The latter function is realized by a pre-torque setting processing shown in FIG. 13. This pre-torque setting processing is repetitively executed by the drive power distribution control device 31 at a regular interval which is determined by a predetermined timer-dependant interrupt processing.

That is, as shown in FIG. 13, in the pre-torque modification section 55, after a predetermined initializing processing, a processing is executed to calculate the vehicle speed V and the slip amount ΔN at S301. In this processing, for example, the vehicle speed V is calculated as an average speed value of the wheel speed signals N3, N4 of the driven or rear wheels. Further, the slip amount ΔN is represented by the value which is obtained by subtracting the vehicle speed V from an average speed value of the wheel speed signals N1, N2 of the drive or front wheels (i.e., the difference= average front wheel speed-average rear wheel speed).

At the next S303, a judgment is made of whether the vehicle speed V is 0 km/h or not. In this processing, the vehicle 11 is judged to stand stopped or not, and if it stands stopped at present (Yes at S303), the routine is advanced to S305 to make a stop flag ON, whereas if the vehicle is traveling, S305 is skipped and S307 is reached. At S305, the stop flag is set ON. This flag is to indicate the occurrence of the fact that the vehicle has been stopped after the modification of a pre-torque map at S319 referred to later. At Step 307 successive thereto, a branch destination is determined to be changed in dependence on the state of the stop flag.

A judgment is made at S307 as to whether or not, the state of the stop flag is ON. If the vehicle 11 has been stopped after the pre-torque map was modified at S319 (i.e., Yes at S307), the pre-torque map is to be modified again, for which purpose, this judgment processing is performed. Therefore, If the stop flag is OFF which means that the vehicle 11 has not been stopped after the pre-torque map was modified at S319 (No at S307), a series of the pre-torque setting processing at this time are terminated, and there is awaited the next processing opportunity given by the timer-dependent interrupt and so on.

If the stop flag is ON (Yes at S307), the routine moves to S309 next thereto, wherein a judgment is made of whether or not, the vehicle speed is more than 0 km/h but less than αkm/h. That is, at S309, a judgment is made as to whether the vehicle is beginning to start or not, by grasping the motion of the vehicle 11 from the vehicle speed V, and the routine is then moved to S311 when the vehicle 11 is in the middle of starting (Yes at S309), but to S317 when it is not in the middle of starting. The predetermined speed "αkm/h" in this particular embodiment is for example, several km/h.

At S311 and S313 next thereto, it is judged whether or not, the vehicle 11 is in the middle of starting, by grasping the motion of the vehicle from the driver's manipulation. Specifically, S311 involves judging whether or not, the brake is OFF, from a brake pedal signal (not shown). If it is judged that the brake pedal has not been stepped on (Yes at S311), the vehicle 11 is judged not to be in the middle of being braked by the brake mechanism. Conversely, if the brake pedal has been stepped on (No at S311), the vehicle 11 is being braked by the brake mechanism, and a series of the pre-torque setting processing are terminated this time to await the next processing opportunity given by the timer-dependent interrupt.

Also at S313, it is judged whether or not, the throttle opening degree is more than a predetermined β%, based on the throttle opening degree signal (θ), that is, whether or not, the driver is stepping on an accel pedal. If the accel pedal has been stepped on (Yes at S313), the vehicle 11 is judged to being accelerated. Conversely, when the accel pedal has not been steeped on (No at S313), the slip caused by the vehicle starting is not generated. Therefore, also this time, a series of the pre-torque setting processing are terminated to await the next processing opportunity given by the timer-dependent interrupt. The predetermined "β%" in this particular embodiment represents, for example, the throttle opening degree which keeps the engine 22 in the state of idling. The aforementioned S309, S311 and S313 are for detecting the starting of the vehicle 11 and constitute start detection step or means.

When the starting of the vehicle is detected through S309, S311 and S313 (i.e., Yes at each of these steps), the routine proceeds to S315 to execute a maximum slip amount renewal processing shown in FIG. 14.

In the maximum slip amount renewal processing, as shown in FIG. 14, first of all, it is judged at S401 whether or not, a slip amount ΔN detected this time exceeds the maximum slip amount ΔNmax. When the detected slip amount ΔN exceeds the maximum slip amount ΔNmax (Yes at S401), the detected slip amount ΔN is renewally stored as the maximum slip amount ΔNmax to replace the same at S403. Conversely, when the detected slip amount ΔN does not exceed the maximum slip amount ΔNmax (No at S401), the maximum slip amount ΔNmax is not to be renewed and hence, S403 is skipped to terminate the maximum slip amount renewal processing and to return the routine to the pre-torque setting processing. Upon returning to S315 from the maximum slip amount renewal processing, the series of pre-torque setting processing are terminated to await the next processing opportunity given by the timer-dependent interrupt.

Returning again to the pre-torque setting routine shown in FIG. 13, when the vehicle speed V is judged to be neither more than 0 km/h nor less than α km/h at S309 (No at S309), the routine moves to a slip level setting processing at S317. As shown in FIG. 15, in the slip level setting processing, it is judged at S501 whether or not, the slip level LV is zero.

That is, the slip level LV is used as an index value which represents the degree of the maximum slip amount ΔNmax set or renewed through a maximum slip amount renewing processing. And, it is judged whether the slip level LV is to be set or to be renewed, and when the slip level LV is judged to be zero (Yes at S501), a new slip level LV which is suitable to the threshold value A is set through those of processing at S511 to S529. Conversely, when the slip level LV is judged not to be zero (No at S501), it is meant that levels 1 to 5 have been set as the slip level LV, and the renewal of the slip level LV is executed based on the present maximum slip amount ΔNmax through the processing at S503 and S507.

S503 and S507 are to adjust and renew the slip level LV having been set, and it is judged at S503 whether or not, the maximum slip amount ΔNmax is larger than the predetermined threshold value A or not. Herein, the "predetermined threshold value A" is a parameter which is used for additionally adjusting the slip level LV by one level and is chosen to take the value of "Level 1 Threshold Value≦Threshold Value A". When it is judged through this processing that the maximum slip amount ΔNmax is larger than the predetermined threshold value A (Yes at S503), S507 is then reached, wherein a processing is executed to increment the slip level LV (i.e., LV=LV+1). Conversely, when the maximum slip amount ΔNmax is not larger than the predetermined threshold value A (No at S503), S504 follows.

At S504, it is judged whether the maximum slip amount ΔNmax is smaller than the predetermined threshold value B or not. Herein, the "predetermined threshold value B" is a parameter for subtractively adjusting the slip level LV by one level, and is chosen to take the value of "Level 1 Threshold Value≧Predetermined Threshold value B". When the maximum slip amount ΔNmax is judged to be smaller than the predetermined threshold value B (Yes at S504), the routine is moved to S505 to execute the processing for decrementing the slip level LV (LV=LV−1). And, the slip level thus renewed is stored in the memory of the drive power distribution control device 31. Further, it is judged at S504 that the maximum slip amount ΔNmax is not smaller than a predetermined threshold value B (No at S504), the slip level LV is not modified to maintain the present slip level LV.

When the adjustment, renewal and storing of the slip level LV is performed through these steps S503 to S507, the slip level setting processing is terminated, and the routine is returned to the pre-torque setting processing shown in FIG. 13.

The threshold values A and B are values which are set to provide a hysteresis in adjusting the once set slip level LV, and the difference between the threshold values A and B (i.e., threshold value A −threshold value B) can make the once set slip level LV not to vary more frequently than required. Although the threshold values A and B are set preferably to satisfy the relation of "Threshold Value B≦Level 1 Threshold Value≦Threshold Value A", they are not limited to these values. Rather, as far as the relation of threshold value B≦threshold value A is satisfied, the threshold vales A and B can be set freely at need.

On the other hand, S511 through S529 are to set a slip level LV appropriate to the maximum slip amount ΔNmax when the slip level is zero. First of all, it is judged at S511 whether or not, the maximum slip amount ΔNmax is smaller than the level 5 threshold value. The level 5 threshold value is set larger than the level 4 threshold value which is compared at S513 or the like. These various level threshold values have the relation of: level 5 threshold value>level 4 threshold value>level 3 threshold value>level 2 threshold value>level 1 threshold value>level 0.

When it is judged at S511 that the maximum slip amount ΔNmax is smaller than the level 5 threshold value (Yes at S511), it is meant that the slip level LV appropriate to the maximum slip amount ΔNmax is the level 4 or smaller than the same, and the next judgment processing is moved to S513. Conversely, when the maximum slip amount ΔNmax is judged not to be smaller than the level 5 threshold value (No at S511), it is meant that the slip level LV appropriate to the maximum slip amount ΔNmax is the level 5, and the routine is moved to S521, wherein the slip level is incremented (LV=LV+1). Then, the routine is moved to S523, S525, S527 and S529 successively, at each of which the slip level is incremented (LV=LV+1). As a result, the slip level is set to the level 5. The slip level LV (level 5) set in this manner is stored in the memory of the drive power distribution control device 31.

At S513, a judgment is made as to whether or not, the maximum slip amount ΔNmax is smaller than the level 4 threshold value. When it is judged at S513 that the maximum slip amount ΔNmax is smaller than the level 4 threshold value (Yes at S513), it is meant that the slip level LV appropriate to the maximum slip amount ΔNmax is the level 3 or smaller the same, and the next judgment processing is moved to S515. Conversely, when the maximum slip amount ΔNmax is judged not to be smaller than the level 4 threshold value (No at S513), it is meant that the slip level LV appropriate to the maximum slip amount ΔNmax is the level 4, and the routine is moved to S523, wherein the slip level is incremented (LV=LV+1). Then, the routine is moved to S525, S527 and S529 successively, at each of which the slip level is incremented (LV=LV+1). As a result, the slip level is set to the level 4. The slip level LV (level 4) set in this manner is stored in the memory of the drive power distribution control device 31.

At S515, a judgment is made as to whether or not, the maximum slip amount ΔNmax is smaller than the level 3 threshold value. When it is judged at S515 that the maximum slip amount ΔNmax is smaller than the level 3 threshold value (Yes at S515), it is meant that the slip level LV appropriate to the maximum slip amount ΔNmax is the level 2 or smaller the same, and the next judgment processing is moved to S517. Conversely, when the maximum slip amount ΔNmax is judged not to be smaller than the level 3 threshold value (No at S515), it is meant that the slip level LV appropriate to the maximum slip amount ΔNmax is the level 3, and the routine is moved to S525, wherein the slip level is incremented (LV=LV+1). Then, the routine is moved to S527 and S529 successively, at each of which the slip level is incremented (LV=LV+1). As a result, the slip level is set to the level 3. The slip level LV (level 3) set in this manner is stored in the memory of the drive power distribution control device 31.

At S517, a judgment is made as to whether or not, the maximum slip amount ΔNmax is smaller than the level 2 threshold value. When it is judged at S517 that the maximum slip amount ΔNmax is smaller than the level 2 threshold value (Yes at S517), it is meant that the slip level LV appropriate to the maximum slip amount ΔNmax is the level 1 or smaller the same, and the next judgment processing is moved to S519. Conversely, when the maximum slip amount ΔNmax is judged not to be smaller than the level 2 threshold value (No at S517), it is meant that the slip level LV appropriate to the maximum slip amount ΔNmax is the level 2, and the routine is moved to S527, wherein the slip level is incremented (LV=LV+1). Then, the routine is moved to S529, at which the slip level is incremented (LV=LV+1). As a result, the slip level is set to the level 2. The slip level LV (level 2) set in this manner is stored in the memory of the drive power distribution control device 31.

At the last S519, a judgment is made as to whether or not, the maximum slip amount ΔNmax is smaller than the level 1 threshold value. When it is judged at S519 that the maximum slip amount ΔNmax is smaller than the level 1 threshold value (Yes at S519), it is meant that the slip level LV appropriate to the maximum slip amount ΔNmax is the level 0, and the slip level remains level 0 without executing any processing for the slip level. Conversely, when the maximum slip amount ΔNmax is judged not to be smaller than the level 1 threshold value (No at S519), it is meant that the slip level LV appropriate to the maximum slip amount ΔNmax is the level 1, and the routine is moved to S529, wherein the slip level is incremented (LV=LV+1) to be set to the level 1. The slip level LV (level 1) set in this manner is stored in the memory of the drive power distribution control device 31. The setting and storing of the slip levels are completed through the processing of these steps S511 to S529, and the maximum slip amount setting processing is terminated to return the routine to the pre-torque setting routine shown in FIG. 13.

In this manner, in the maximum slip amount setting processing, the slip levels are set and stored in dependence on the maximum slip amount ΔNmax through S511 to S529, and a learning processing is carried out through S503 to S507 wherein the slip levels are modified (adjusted or renewed) in dependence on the change in the maximum slip amount ΔNmax. Accordingly, it can be done at S319 of the pre-torque setting processing to modify the pre-torque map in dependence on the slip levels so learnt, as will be explained hereinafter.

Referring back to FIG. 13 showing the pre-torque setting processing, upon termination of the slip amount setting processing at S317, a processing at S319 is next executed for modifying the pre-torque map. More specifically, as shown in FIG. 16, the torque map which defines the pre-torque at 0 km/h of the vehicle speed is modified in dependence on the level value of the calculated slip level LV. The torque map shown in FIG. 16 represents the throttle opening degree (0% through 100%) on Y-axis (θ), the torque on Z-axis and the vehicle speed V on X-axis (V), and the torque T1 at 0 km/h of the vehicle speed is set in the form of the torque map.

For instance, when the maximum slip amount ΔNmax is made larger than threshold value (A) at S403 of the slip amount renewal processing (FIG. 14) at the last time, the slip level LV which was set to the level 2 at the last time is renewed to the level 3 by the execution of S507 of the slip level setting processing (FIG. 15). In connection with this, the pre-torque map is modified from the level 2 characteristic to the level 3 characteristic by the processing at S319 shown in FIG. 13. On the contrary, when the maximum slip amount ΔNmax is made smaller than the threshold value (B) at S403 of the slip amount renewal processing at the last time, the slip level LV which was set to the level 4 for example is renewed to the level 3 by the execution of S505 of the slip level setting processing, in the connection with which the pre-torque map is modified from the level 4 characteristic to the level 3 characteristic by the execution of the processing at S319 of the pre-torque setting processing.

After the processing for modifying the pre-torque map is executed at S319, the stop flag is set from ON to OFF at the successive S321, and the maximum slip amount ΔNmax is cleared to zero at S323. Thus, a series of steps for the pre-torque setting processing are terminated, and the next processing opportunity for executing this processing is awaited to be given by the next timer-dependent interrupt.

As described hereinabove, in the drive power distribution control device according to the third embodiment, the pre-torque modification section 55 detects the starting of the vehicle by the execution of S309 and calculates the slip amount ΔN from the wheel speed difference between the front wheels 16, 16 driven by the drive power of the first propeller shaft 15a and the rear wheels 20, 20 driven by the drive power of the second propeller shaft 15b. Then, the pre-torque operation section 53 determines the degree of the connection of the first propeller shaft 15a with the second propeller shaft 15b which connection is to be made by the drive power transmission device (torque coupling) 17 when the vehicle begins to start. Consequently, since the degree of the drive power by the drive power transmission device 17 can be determined in dependence on the slip amount ΔN at the starting of the vehicle 11, the slip of the vehicle 11 can be restrained in adaptation for the state of a road surface at the starting of the vehicle 11.

In the forgoing drive power distribution control device 31 according to the third embodiment, the pre-torque modification section 55 of the device 31 sets and stores the slip level LV based on the maximum slip amount ΔNmax which is the largest in value of those calculated by the processing from S511 through S529 and further executes the learning of modifying and storing the slip level LV so set in dependence on the modification of the maximum slip amount ΔNmax at S503, S507. Then, since the pre-torque operation section 53 determines the degree of the drive power by the drive power transmission device 17 based on the slip level LV which has been so learnt, the slip of the vehicle 11 can be restrained in dependence on the change in the slip amount ΔN which change corresponds to the state of a road surface at the starting of the vehicle 11.

In short, according to the forgoing drive power distribution control device 31, the starting performance can be improved on a slippery road whose surface has a small ($\mu$) or a small friction coefficient as well as on a bumpy road, and further, the fuel consumption performance can be improved by diminishing the torque distribution to the drive wheels (e.g., rear wheels 20, 20) when the vehicle 11 runs on a large ($\mu$) road on which slip is little. Accordingly, it is possible to improve not only the starting performance but also the fuel consumption performance. In addition, the slip on the clutch plates in the main clutch mechanism 120c is restrained to the least, heat generation caused by the slip on the clutch plates can also be restrained.

FIG. 17 shows a modification of the third embodiment, wherein an additional torque operation section 55a is employed in place of the pre-torque modification section 55 constituting the command torque generating section 51. More specifically, the foregoing third embodiment is designed so that the pre-torque modification section 55 executes the pre-torque modification processing (S319) of the pre-torque setting processing so as to modify the torque map shown in FIG. 16. In contradistinction thereto, the present modified form of the third embodiment may be constituted as shown in FIG. 17, wherein the addition torque operation is executed instead of the pre-torque modification processing (S319) still at the same step thereof. In this modified case, the additional torque operation processing is to take use of the level 0 data as the base map and then, to make addition of a necessary torque depending on the level value of the slip level LV to the base map characteristic. By making the modification as above, it becomes unnecessary to make direct modification of the pre-torque map or the ΔN toque map, so that fine or minute torque setting which reflects the accuracy in operation processing can advantageously be done with respect to the additional torque.

Although the foregoing third embodiment exemplifies those slip levels divided into five ranks of 0 to 5, the present invention is not limited to so doing. For example, the slip levels can be arbitrarily set to, for example, the rank of 0 to 15 or the rank of 0 to 30 as occasion arises.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive power distribution control device for a four-wheel drive vehicle for variably controlling a drive power distributed from an engine to a driven wheel axle by variably controlling the power transmission rate of a drive power transmission device based on various sensing means including at least vehicle speed sensing means for detecting a vehicle speed, said drive power distribution control device comprising:

traveling state judgment means responsive to a vehicle speed signal output from said vehicle speed sensing means for judging whether said vehicle is beginning to start or not and also for judging the state or manner in which the vehicle is beginning to start; and transmission torque control means operable when said vehicle is judged to be beginning to start by said traveling state judgment means, for controlling the drive torque transmitted to said driven wheel axle in dependence on the state or manner judged by said traveling state judgment means.

2. A drive power distribution control device for a four-wheel drive vehicle for variably controlling the drive power distributed to a driven wheel axle by variably controlling the power transmission rate of a drive power transmission device based on a vehicle speed obtained from vehicle speed sensing means and an acceleration manipulation amount obtained from acceleration manipulation amount detection means, said control device comprising:

traveling state judgment means for judging whether the vehicle is beginning to start or not, and control means for controlling the power transmission rate of said drive power transmission device to make the drive power distributed to said driven wheel axle larger than an ordinary value for an ordinary four-wheel drive traveling when said traveling state judgment means judges that said vehicle is beginning to start.

3. A drive power distribution control device as set forth in claim 2, wherein said traveling state judgment means comprises:

first comparison means for comparing said vehicle speed with a predetermined threshold value for judgment of said vehicle speed;

second comparison means for comparing said acceleration manipulation amount with another predetermined threshold value for judgment of said acceleration manipulation amount; and judgment means for judging whether the vehicle is beginning to start or not, based on the results of the comparisons performed by said first and second comparison means.

4. A drive power distribution control device as set forth in claim 2, further comprising:

compensation amount calculation means for calculating a compensation drive power distribution amount based on a rotational difference between a drive wheel axle and said driven wheel axle; and means for adding said compensation drive power distribution amount calculated by said compensation amount calculation means to said ordinary value for said ordinary four-wheel drive traveling, when said vehicle is judged to be beginning to start by said traveling state judgment means.

5. A drive power distribution control device as set forth in claim 4, further comprising:

storage means for storing a characteristic map to be used in obtaining said compensation drive power distribution amount; and wherein:

said compensation amount calculation means obtains said compensation drive power distribution amount by reference to said characteristic map stored in said storage means based on the rotational difference between said drive wheel axle and said driven wheel axle.

6. A four-wheel drive vehicle comprising:

a primary drive wheel axle connected to drive wheels a secondary drive wheel axle connected to driven wheels;

drive means for driving said primary drive wheel axle;

a drive power transmission device for transmitting the drive power from said drive means to said secondary drive wheel axle;

detection means for detecting whether a quick starting has taken place or not of said vehicle, based on a predetermined high drive power output from said drive means; and control means for reducing the drive power transmitted from said drive power transmission device to said secondary drive wheel axle when said quick stating has taken place, by a predetermined amount than that which said drive power transmission device transmits to said secondary drive wheel axle when said vehicle is in an ordinary four-wheel drive traveling.

7. A four-wheel drive vehicle as set forth in claim 6, wherein:

said drive means comprises an internal combustion engine; and said control means controls the drive power to be transmitted to said secondary drive wheel axle based on the rotational speed of said engine and the traveling speed of said vehicle.

8. A four-wheel drive vehicle as set forth in claim 6, wherein:

said drive power transmission device comprises an electromagnetic drive power transmission mechanism for being put into operation when an electric current is applied thereto, to transmit the drive power output from said drive means to said secondary drive axle; and said control means controls the drive power to said secondary drive wheel axle by controlling said electric current applied to said electromagnetic drive power transmission mechanism.

9. A control device for a vehicle drive power transmission device of a vehicle of the type wherein one drive axle and the other drive axle are connected by a drive power transmission device in dependence upon a wheel speed difference between drive wheels driven by the drive power of said one drive axle and driven wheels driven by the drive power of said other drive axle so as to transmit the drive power from said one drive axle to said other drive axle, said control device comprising:

vehicle starting detection means for detecting whether said vehicle is beginning to start or not;

slip amount calculation means for calculating a slip amount based on said wheel speed difference between said drive wheels rotated by the drive power of said one drive axle and said driven wheels rotated by the drive power of said other drive axle; and connection degree determination means responsive to said slip amount calculated by said slip amount calculation means for determining the connection degree by said drive power transmission device of said one drive axle with said other drive axle when it is detected by said vehicle starting detection means that said vehicle is beginning to start.

10. A control device as set forth in claim 9, wherein said connection degree determination means comprises:

slip level setting means for setting a slip level based on said slip amount calculated by said slip amount calculation means and for storing the set slip level therein; and slip level learning means for executing the learning of modifying said slip level stored in said slip level setting means in dependence on the variation in said slip amount calculated by said slip amount calculation means and for storing the modified slip level in said slip level setting means;

whereby said connection degree is determined based on said slip level learned by said slip level learning means.

11. A drive power distribution control method for a four-wheel drive vehicle, of variably controlling the drive power distributed from an engine to a driven wheel axle by variably controlling the power transmission rate of a drive power transmission device based on various sensing means including at least vehicle speed sensing means for detecting a vehicle speed, said drive power distribution control method comprising:

a traveling state judgment step responsive to detection signals from various sensing means, of judging whether said vehicle is beginning to start or not and also of judging the state or manner in which the vehicle is beginning to start; and a transmission torque control step executed when it is judged at said traveling state judgment step that the vehicle is beginning to start, of controlling the drive torque transmitted to said driven wheel axle in dependence on the state or manner judged at said traveling state judging step.

12. A drive power distribution control method for a four-wheel drive vehicle, of variably controlling the drive power distributed to a driven wheel axle by variably controlling the power transmission rate of a drive power transmission device based on a vehicle speed and an acceleration manipulation amount, said control method comprising:

a traveling state judgment step of judging whether said vehicle is beginning to start or not, and a control step of controlling the power transmission rate of said drive power transmission device to make the drive power distributed to said driven wheel axle larger than an ordinary value for an ordinary four-wheel drive traveling when it is judged at said traveling state judgment step that said vehicle is beginning to start.

13. A drive power distribution control method for a four-wheel drive vehicle having a primary drive wheel axle connected to drive wheels; a secondary drive wheel axle connected to driven wheels; drive means for driving said primary drive wheel axle; and a drive power transmission device for transmitting the drive power from said drive means to said secondary drive wheel axle; said method comprising:

a detection step of detecting whether a quick starting has taken place or not of said vehicle, based on a predetermined high drive power output from said drive means; and a control step of reducing the drive power transmitted from said drive power transmission device to said secondary drive wheel axle when said quick stating has taken place, by a predetermined amount than that which said drive power transmission device transmits to said secondary drive wheel axle when said vehicle is in an ordinary four-wheel drive traveling.

14. A control method for a drive power transmission device of a four-wheel drive vehicle wherein said drive power transmission device connects one of drive axles with the other drive axle in dependence upon a wheel speed difference between drive wheels rotated by said one drive axle and driven wheels rotated by said other drive axle so as to transmit the drive power from one drive axle to said other drive axle, said control method comprising:

a traveling start detection step of detecting the starting of said vehicle;

a slip amount calculation step of calculating a slip amount based on the wheel speed difference between said drive wheels rotated by said one drive axle and said driven wheels rotated by said other drive axis; and a connection degree determination step of determining the connection degree between said one drive axle and said other drive axle to be made by said drive power transmission device, based on said slip amount calculated at said slip amount calculation step when the starting of said vehicle is detected at said traveling start detection step.

15. A control method as set forth in claim 14, wherein said connection degree determination step includes:

a slip level setting step of setting and storing a slip level based on said slip amount calculated at said slip amount calculation step;

a slip level learning step of executing the learning of modifying and storing said slip level stored at said slip level setting step in dependence upon the variation of said slip amount; and wherein:

said connection degree determination step determines the connection degree based on said slip level learned at said slip level learning step.

* * * * *